(12) United States Patent
Yilanci et al.

(10) Patent No.: US 12,217,367 B2
(45) Date of Patent: Feb. 4, 2025

(54) SYSTEMS AND METHODS FOR PERSONALIZED AND INTERACTIVE EXTENDED REALITY EXPERIENCES

(71) Applicant: Noderix Teknoloji Sanayi Ticaret Anonim Sirketi, Izmir (TR)

(72) Inventors: Berkay Baris Yilanci, Aydin (TR); Berkan Özgür, Karabağlar/İzmir (TR)

(73) Assignee: Noderix Teknoloji Sanayi Ticaret Anonim Sirketi, Izmir (TR)

(*) Notice: Subject to any disclaimer, the term of this patent is extended or adjusted under 35 U.S.C. 154(b) by 0 days.

(21) Appl. No.: 17/522,001

(22) Filed: Nov. 9, 2021

(65) Prior Publication Data

US 2022/0148268 A1 May 12, 2022

Related U.S. Application Data

(60) Provisional application No. 63/111,793, filed on Nov. 10, 2020.

(51) Int. Cl.
*G06T 19/00* (2011.01)
*G06Q 30/0204* (2023.01)
*G06Q 30/0251* (2023.01)
*H04W 4/38* (2018.01)

(52) U.S. Cl.
CPC ....... *G06T 19/006* (2013.01); *G06Q 30/0204* (2013.01); *G06Q 30/0269* (2013.01); *G06T 19/003* (2013.01); *H04W 4/38* (2018.02)

(58) Field of Classification Search
CPC ... G06T 19/006; G06T 11/00; G06T 2210/62; G06T 19/003; E02F 9/261; B60R 1/24; B60R 2300/105; B60R 2300/302; B60R 2300/8093; G06V 20/58
See application file for complete search history.

(56) References Cited

U.S. PATENT DOCUMENTS

| | | | |
|---|---|---|---|
| 9,363,569 B1* | 6/2016 | van Hoff | H04N 5/23238 |
| 10,152,118 B2 | 12/2018 | Primus et al. | |
| 10,438,262 B1* | 10/2019 | Helmer | G06V 10/255 |
| 10,632,277 B2 | 4/2020 | Goldberg et al. | |
| 11,169,600 B1* | 11/2021 | Canberk | G02B 5/0236 |
| 11,348,317 B2* | 5/2022 | Moroze | G06F 16/54 |
| 2017/0060230 A1* | 3/2017 | Faaborg | G06F 3/04883 |
| 2017/0109936 A1* | 4/2017 | Powderly | G06F 1/163 |
| 2018/0165713 A1* | 6/2018 | O'Hanlon | G06Q 30/0257 |
| 2018/0189840 A1 | 7/2018 | Barnett et al. | |
| 2018/0364801 A1* | 12/2018 | Kim | G06T 15/205 |
| 2019/0198153 A1 | 6/2019 | Hill et al. | |
| 2019/0313059 A1* | 10/2019 | Agarawala | G06T 19/006 |
| 2020/0145644 A1* | 5/2020 | Cordes | H04N 13/111 |
| 2020/0184731 A1 | 6/2020 | Egri et al. | |
| 2021/0118218 A1* | 4/2021 | Huang | G06T 19/006 |
| 2021/0342886 A1* | 11/2021 | O'Hanlon | G06V 40/172 |

(Continued)

*Primary Examiner* — Chante E Harrison
(74) *Attorney, Agent, or Firm* — Bayramoglu Law Offices LLC

(57) ABSTRACT

Described herein are technologies for generating and providing a virtual experience. The virtual experience includes digital elements that are generated and provided according to settings as well as user feedback and feedback from sensors in an environment that is being represented by the virtual experience. The virtual experience includes a real world image of the environment and virtual objects overlapping the real world image.

23 Claims, 16 Drawing Sheets

(56) References Cited

U.S. PATENT DOCUMENTS

| | | | |
|---|---|---|---|
| 2021/0383912 A1* | 12/2021 | Jackson | A61B 5/165 |
| 2022/0076803 A1* | 3/2022 | Sugiyama | G16H 10/60 |
| 2022/0130115 A1* | 4/2022 | Assouline | G06T 19/20 |
| 2022/0137701 A1* | 5/2022 | Bowman | G06F 3/165 |
| | | | 345/156 |
| 2022/0218266 A1* | 7/2022 | Hara | A63F 13/25 |
| 2022/0237816 A1* | 7/2022 | Jiang | G06V 20/20 |
| 2022/0283631 A1* | 9/2022 | Peng | G06V 10/44 |

\* cited by examiner

SYSTEMS AND METHODS FOR PERSONALIZED AND INTERACTIVE EXTENDED REALITY EXPERIENCES

CROSS-REFERENCE TO RELATED APPLICATIONS

The present application claims the benefit of priority from U.S. Provisional Patent Application No. 63/111,793, filed on Nov. 10, 2020, and entitled "Systems and Methods for Personalized and Interactive Extended Reality Experiences", the entire disclosure of which application is hereby incorporated herein by reference.

TECHNICAL FIELD

This disclosure is related to extended reality systems and more particularly systems and methods for personalized and interactive extended reality experiences.

BACKGROUND

Extended Reality (XR) is an umbrella term that encompasses immersive technologies such as augmented reality (AR), virtual reality (VR), and mixed reality (MR), as well as other future similar technologies may bring.

Augmented reality is the overlap between the real world and the digitally created content. AR allows the user to interact with both the real world and digital items. Virtual reality is an environment created with computer-generated stereo visuals that surrounds the user and replaces the real-world environment around it. In this environment, the user interacts with the virtual world in real-time. Mixed reality experience is the experience that seamlessly combines the user's real-world environment and digitally generated content. In other words, VR and AR technology exist at the same time.

Recent XR systems employ smartphones and head-mounted displays (HMD) including optical head-mounted displays, for instance, smart glasses. In technical ways, HMDs are superior to smartphones which have a narrower hardware variety. So, it is easier to optimize the virtual experience, and they usually offer better hardware configurations for performance challenges for processing and rendering virtual worlds. Smartphones are today's conventional displays whereas HMDs are still struggling in terms of affordability, availability, convenience, and ease of use and certainly trying to find their place in daily usage.

The utilization of augmented reality has grown with the rise of augmented reality filtering systems. A system that personalizes the real world via overlapping with virtual data has increasingly been popular with its usage on social media platforms. One example of this usage is when a social platform user augments his/her image with virtual objects of their liking for sharing purposes.

XR experiences on smartphones are not always possible or reliable. One reason is that some of the smartphones do not support AR. Even when they do, AR might not operate reliably under low light situations. Various AR applications require the scanning of a marker or tap-to-place actions to place virtual objects in the environment. Providing a physical marker to the users might be a logistical issue for businesses. Furthermore, known methods such as tap-to-place actions followed by plane detection are not always user-friendly and reliable. Given that there are thousands of devices on the market and various usage conditions, there is a need to find a common solution to provide a robust AR experience to the users.

SUMMARY

People commonly use their computing devices, such as smartphones or future smart displays (e.g., mobile or wearable, physical, projected, simulated, holographic, etc. displays), for many purposes. Technologies, disclosed herein, aim to improve the quality of the aforementioned utilization for users. More specifically, virtual experiences that are provided by the disclosed system, are embodied as an instrument of guided and unguided open-eyed meditation, therapy, coaching, guided and unguided mental exercise, virtual assistant, entertainment, shopping, financial activities, and examples of similar nature. Additionally, in the present system, virtual experiences are provided to the user in a seamless manner, enabling realistic, believable, relatable, enjoyable personal experience that is enhanced with personalized configurations of virtual objects, environment audio, affirmations, meditations, exercises, and other types of practices to activate human senses. Furthermore, a seamless delivery method of virtual environment employing computing devices, utilizing an adaptive and predictive method switching mechanism is provided. The system is also characterized by a lack of need to use markers or tap-to-place functions after a surface detection procedure is completed. This increases the user-friendliness of the method compared to marker-based and markerless AR methods. Additionally, for further improvement of the virtual experience delivered by the system and also used in fields of dating (matching), hiring, employee mental health detection, etc., mental profile determination, as an output of the virtual experience is important. Furthermore, calls to action in a virtual experience may be considered as a new mode of advertisement.

The virtual experience mentioned in the disclosed system is a virtual setting, including in-motion or movable virtual objects contained or limited by a virtual space or a virtual representation of a space mapped in real-world that may be an indoor or outdoor space. Further, it includes audio elements that imitate environment sounds, sounds that are relevant to virtual objects, and speeches. Employing a computing device with a display screen, users may walk around the experience, interact with virtual objects, and manipulate them via various input methods. Moreover, virtual experiences have the means to stimulate, calm, impress, reach out, meditate, and motivate the end user in many ways.

Meditation is defined as some comprehensive psychological and behavioral training, which helps individuals establish a special attention mechanism to achieve overall psychological improvement. It has been proven that meditation can improve a variety of health problems related to the patient's lifestyle, including relapse of depression in patients with depression and pain relief in patients with chronic pain. Meditation has also been shown to reduce stress and increase relaxation, which is beneficial to many people, including those with low life satisfaction.

To generate personalized virtual experiences, user's personal data and interactions inside the virtual environment are processed using statistics and reasoning mechanisms. Said personal data can include age, gender, geographical region, interests, hobbies, personal notes, memos, photographs, videos, and certain preferences of virtual experience. To conclude a virtual experience, a call to action is presented to the user based on an action selection method by evaluating various data involving users collected from several sources and ways.

Further, the method of augmented reality used to create a virtual experience is determined by a computer-implemented method, whose embodiments will be disclosed in the detailed description. Methods involve light estimation, device hardware configuration check, performance evaluation, etc. Afterward, 3D mapping of the environment is done, depending on the aforementioned conditions, to set the physical configurations of the virtual experience. The method allows the creation of virtual experience without the need to scan a marker or tap-to-place actions on detected surfaces. This improves the experience and might increase the adoption of AR-based technology products by the users.

In some embodiments, the aspects of the present disclosure can generate flocks of animals, with respecting animal sounds, environmental sounds, affirmations about users' personal needs in a calming tone, and offering users a suggestion based on their needs that can be an advertisement which the system concluded to be convenient. The advertisement could be related to a product or service in one or more of the areas where the user needs some guidance and help such as health, wealth, fitness, relationships, finances, and etc. In some embodiments, this call to action can be presented in a virtual animated gift box. The gift box can contain a direct advertisement, promotion, or a discount for some products or services related to the user's personality model constructed given the inputs provided by themselves or collected within AR experiences.

Some parts of the disclosure are cases that are specific to augmented reality to gain a better understanding of some of the embodiments. It should be understood that the "virtual experience" concept described in this system is intended to be used in virtual reality, augmented reality, mixed reality, and all the extended reality technologies. For example, in the embodiments in detailed description, one can easily reproduce the embodiments for both virtual and augmented reality.

In summary, the systems and methods (or techniques) disclosed herein can provide specific technical solutions to at least overcome the technical problems mentioned in the background section and other parts of the application as well as other technical problems not described herein but recognized by those skilled in the art.

With respect to some embodiments, disclosed herein are computerized methods for generating and providing a virtual experience, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method of generating and providing a virtual experience.

With respect to some embodiments, a system is provided that includes at least one computing device configured to generate and provide a virtual experience. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

For example, some embodiments include a method that includes steps implemented by a computing system. The steps include generating, by a computing system, a virtual experience including digital elements based on predetermined settings The generating of the virtual experience includes generating a real world image and virtual objects, and wherein the digital elements include the real world image and the virtual objects. The steps also include outputting, by the computing system, the real world image to be displayed on a display screen as well as outputting, by the computing system, the virtual objects to be displayed on the display screen. The virtual objects overlap the real world image to provide the virtual experience. The steps also include determining, by the computing system, movement metrics based on information sensed by sensors that are in a real world location that is proximate to a real world location recorded in the real world image. Also, the steps include continuing, by the computing system, to output the virtual objects to move together in the real world image according to the movement metrics.

In some embodiments of the method, the step also include: (1) tracking, by the computing system, user feedback data collected by the sensors or second sensors, actuators, or other types of devices that collect input from a user, (2) selecting, by the computing system, a part of the user feedback data based on predetermined behavioral settings stored in the computing system, and (3) outputting, by the computing system, reactions of the digital elements in the virtual experience to be displayed on the display screen according to the selected part of the feedback data.

In some embodiments of the method, the virtual experience includes an augmented reality (AR) virtual experience. In some embodiments of the method, the virtual experience includes a mixed reality (MR) virtual experience.

In some embodiments of the method, the information sensed by the sensors includes data collected from an accelerometer. In some embodiments of the method, the information sensed by the sensors includes data collected from a gyroscope. In some embodiments of the method, the information sensed by the sensors includes data collected from a global positioning system. In some embodiments of the method, the information sensed by the sensors includes data collected from a camera feed. In some embodiments of the method, the camera feed uses simultaneous localization and mapping (SLAM). In some embodiments of the method, the information sensed by the sensors includes data collected from an accelerometer, a gyroscope, a global positioning system, and a camera using a camera feed using simultaneous localization and mapping (SLAM).

In some embodiments of the method, the method further includes generating and outputting, by the computing system, advertising content to be displayed on the display screen. In some embodiments of the method, the generating of the advertising content is based on user profile data of a user. In some embodiments of the method, the user profile data includes demographic data of the user. In some embodiments of the method, the user profile data includes psychographic data of the user. In some embodiments of the method, at least part of the advertising content is anchored to at least one of the virtual objects.

In some embodiments of the method, the method further includes encoding, by the computing system, the digital elements to store the virtual experience in virtual experience keys. In some embodiments of the method, the method further includes decoding, by the computing system, the virtual experience keys to output the virtual experience according to a predetermined group of settings.

In some embodiments of the method, the method further includes: (1) adding, by the computing system, puzzles to the virtual experience, (2) tracking, by the computing system, interaction with the puzzles by a user, (3) scoring, by the computing system, the interaction with the puzzles, and (4) adding, by the computing system, results of the scoring to the virtual experience.

An example object of the disclosed technologies is to present a system and method for generating personalized and interactive extended reality experiences. Another example object of the disclosed technologies is to present a system and method for personalized and interactive extended reality experiences whereby a more immersive and precise experience modality is offered with extensive data gathered from the surroundings. Another example object of the disclosed technologies is to present a system and method for personalized and interactive extended reality experiences whereby personal data associated with age, gender, geographical region, interests, hobbies, personal notes, memos, photographs collected from various sources, and data of users' way of using the virtual experience are used. Another example object of the disclosed technologies is to present a system and method for personalized and interactive extended reality experiences whereby said experiences are rendered exchangeable by using blockchain mechanisms.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure. It is to be understood that the accompanying drawings presented are intended for the purpose of illustration and not intended to restrict the disclosure.

DETAILED DESCRIPTION

Figure 1:
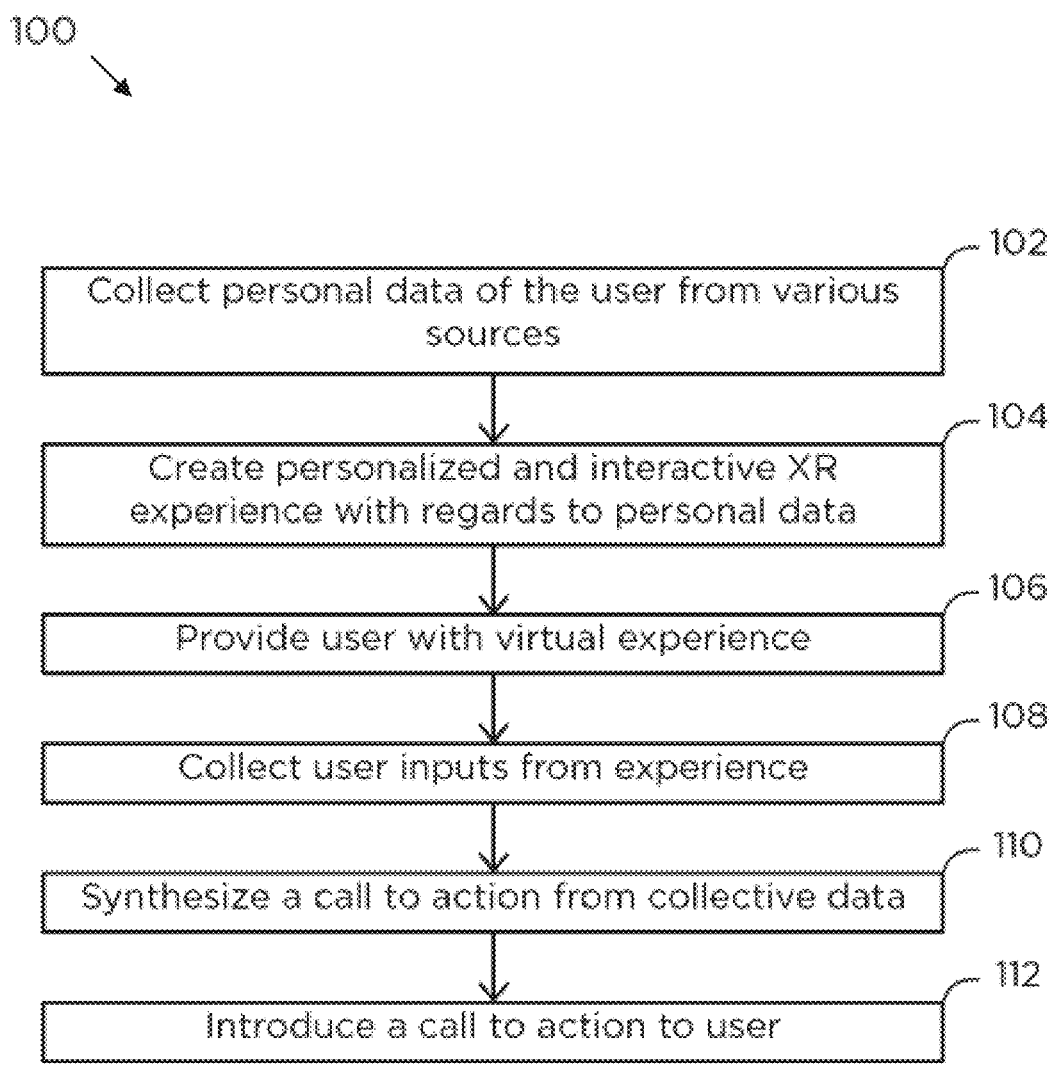
FIG. 1 illustrates operations of a system, in accordance with some embodiments of the present disclosure.

The utilization of computing devices by users appears in many ways. For example, users can use it to pass time, relax, entertain themselves, socialize, improve their mental well-being, shop, and invest. Disclosed are systems and methods that generate personalized and interactive virtual experiences that improve user experience in such cases. As FIG. 1 illustrates, an embodiment of the system 100 is, according to certain collected personal data of the user 102, a virtual experience that is the combination of virtual objects, environment audio, multidimensional audio, affirmations, meditations, mental exercises is created 104 and presented 106 to the user to experience it in the client device in users' 3D mapped physical environment. Users' inputs such as movement, behavior, voice, sound, touch continue to manipulate and rebuild the virtual experience 108. Subsequently, a call to action is made 112 concerning the outcome of the synthesized 110 user data.

Figure 2:
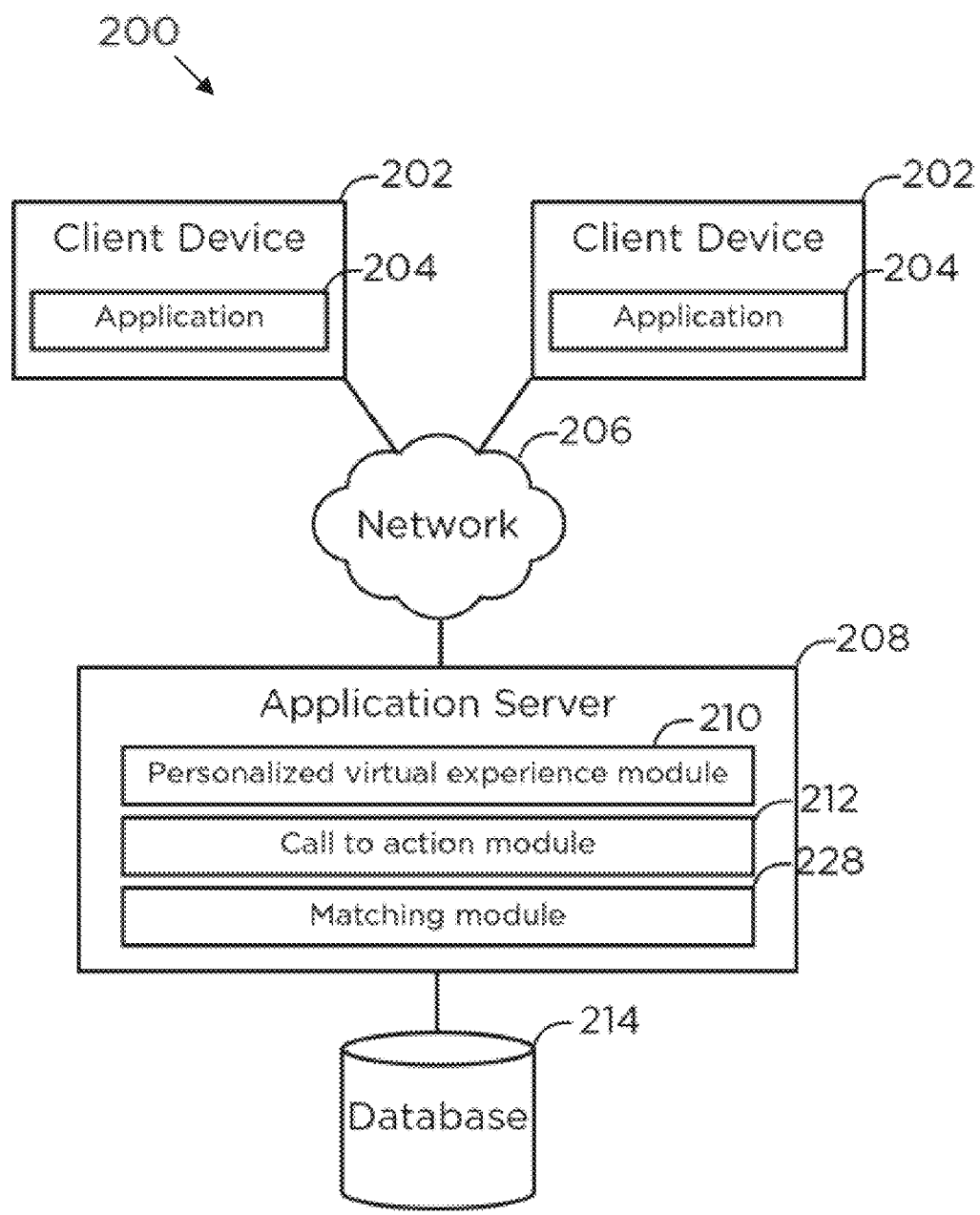
FIG. 2 illustrates a network diagram of components of the system, in accordance with some embodiments of the present disclosure.
Figure 3:
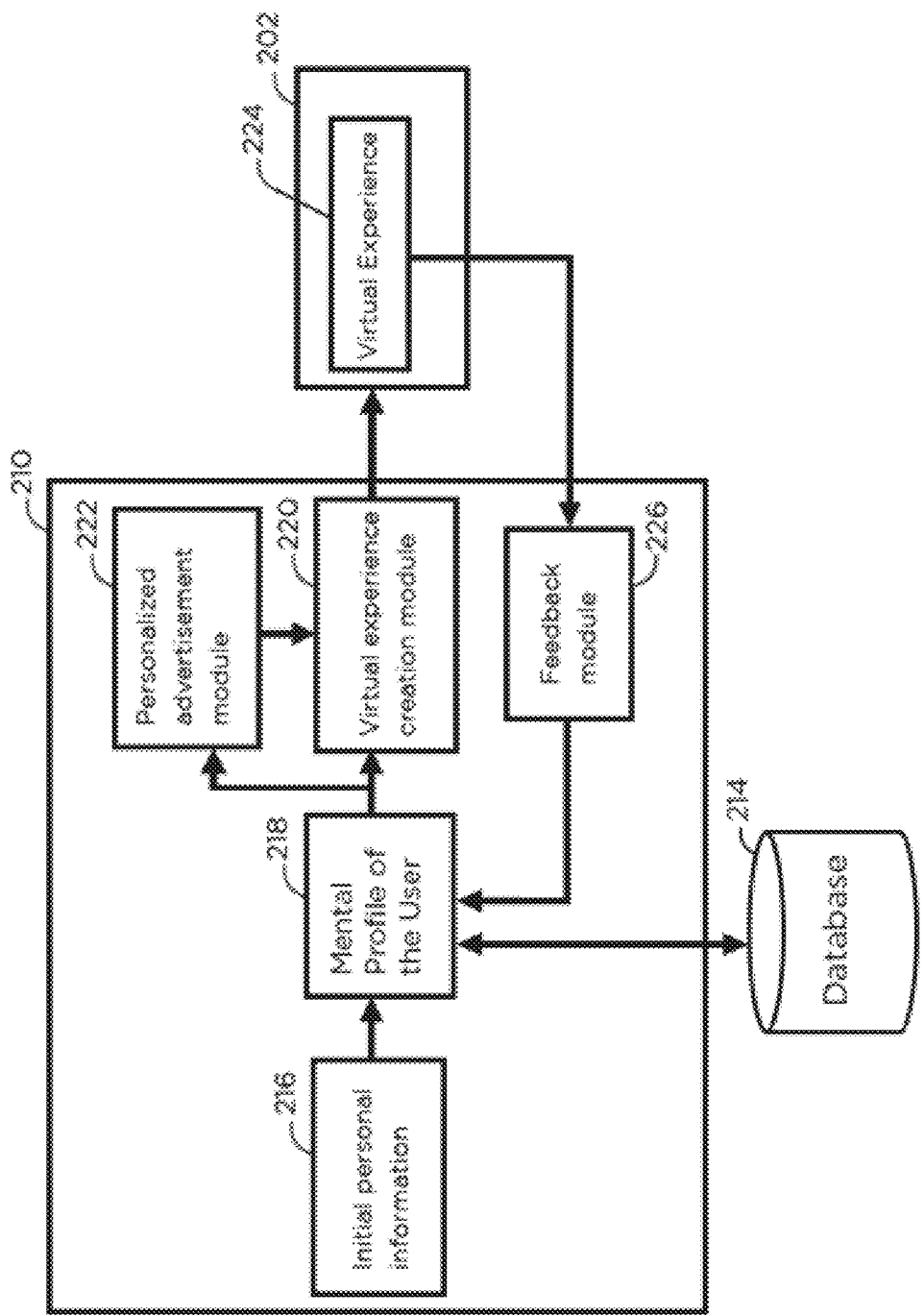
FIG. 3 illustrates aspects of a personalized virtual experience module, in accordance with some embodiments of the present disclosure.
Figure 4:
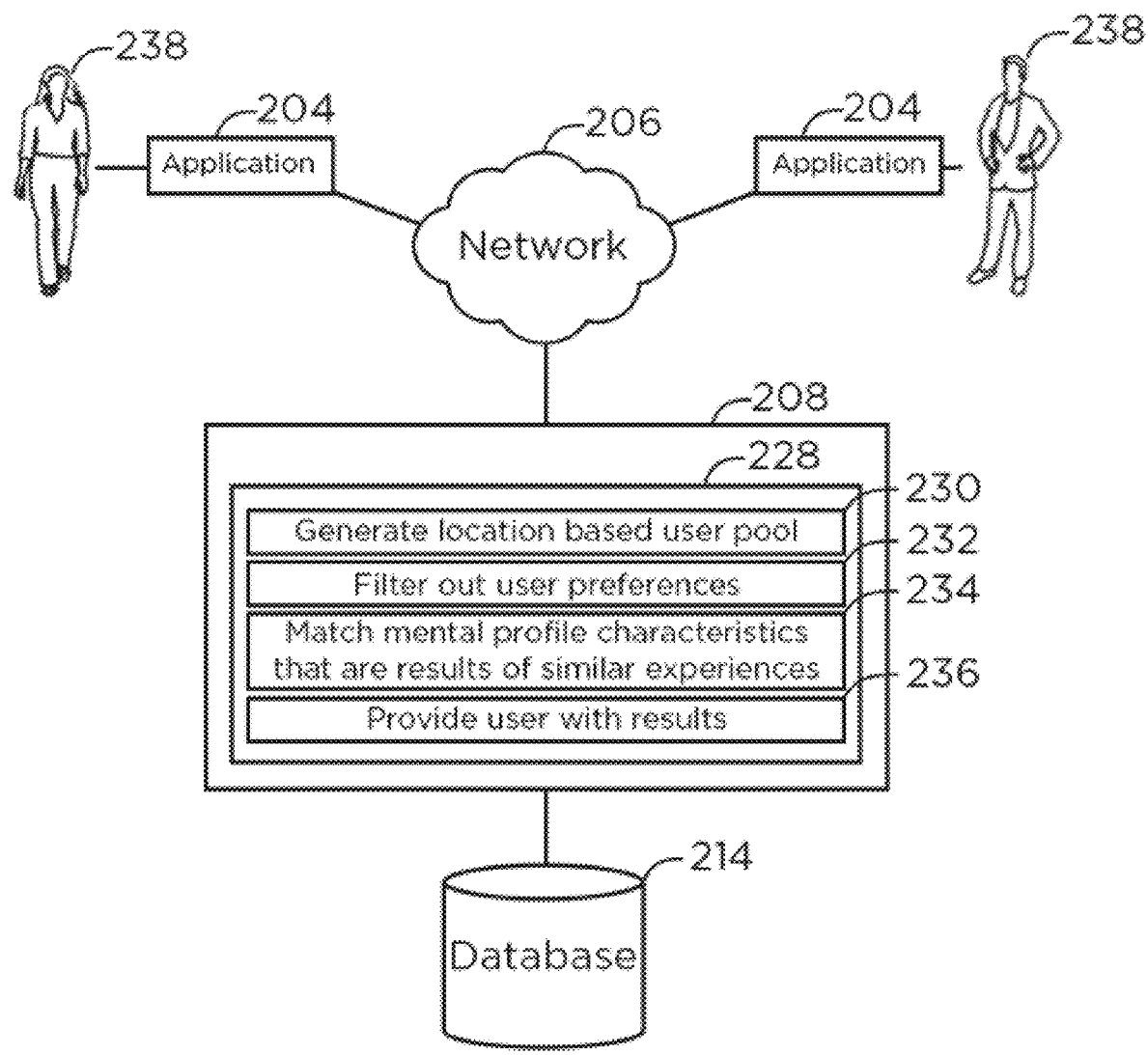
FIG. 4 illustrates a diagram of a matching module, in accordance with some embodiments of the present disclosure.

Shown in FIG. 2, an embodiment of the disclosed system 200 includes an app or applet 204 running on a computing device 202, a database that certain assets stored 214, a server that can belong to an embodiment of the system that is an application 208, which includes personalized virtual experience module 210, call to action module 212, and matching module 228 components.

Figure 6:
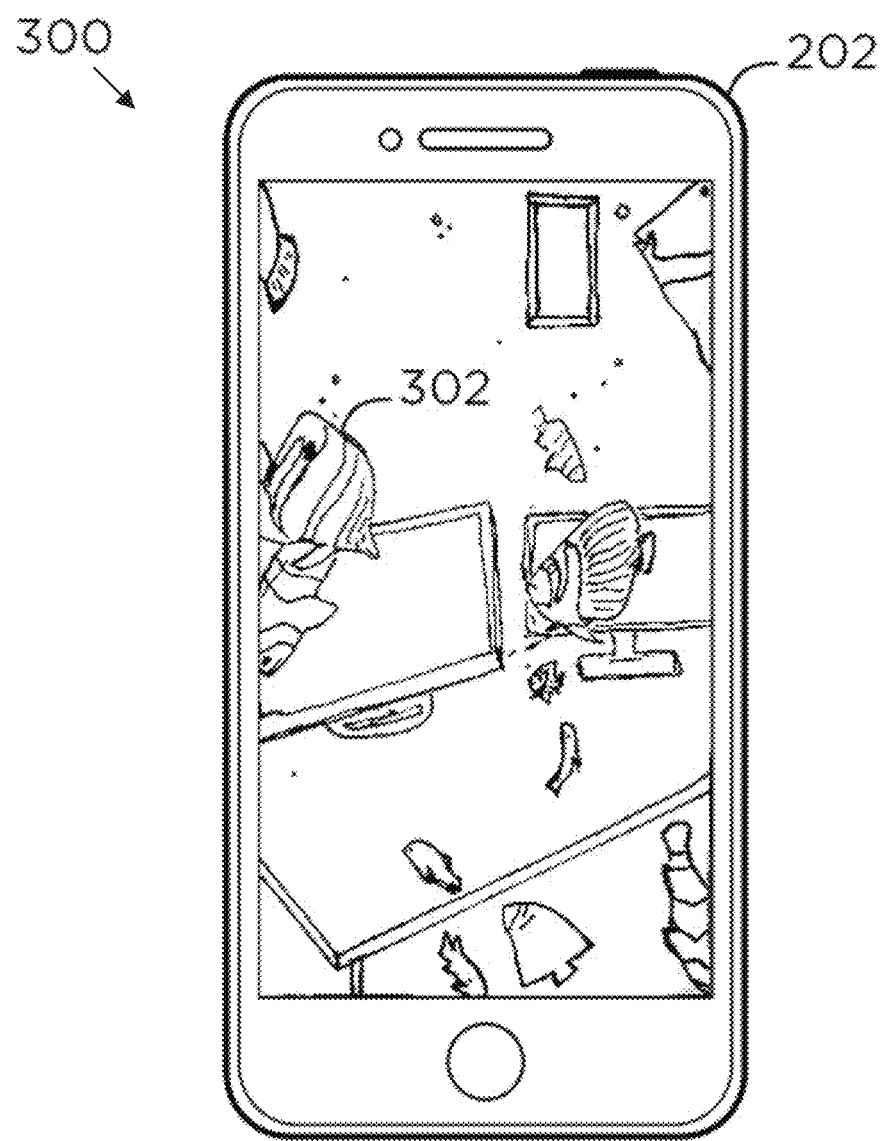
FIGS. 6, 9, and 10 illustrate a device displaying user interface aspects of the system, in accordance with some embodiments of the present disclosure.

As shown in FIG. 6 Virtual experience visualization on a smartphone screen 300, includes computer-generated images of virtual objects 302 on screen of a computing device 202. In some embodiments, as it is in FIGS. 6 and 7, the virtual experience overlaps with the real world 400, and a camera feeds over a display of the computing device 202, creating augmented reality experiences. Some embodiments can include a computing device with a display screen, and the user can experience the virtual world as in virtual reality. Virtual experiences further include virtual objects that are appropriated in a virtual three-dimensional (3D) space according to the mapped physical environment 402. The appropriation method is associated with characteristics of the placed virtual objects with respect to mapped 3D space such as size, fullness, number of objects, and animation speed.

Figure 7:
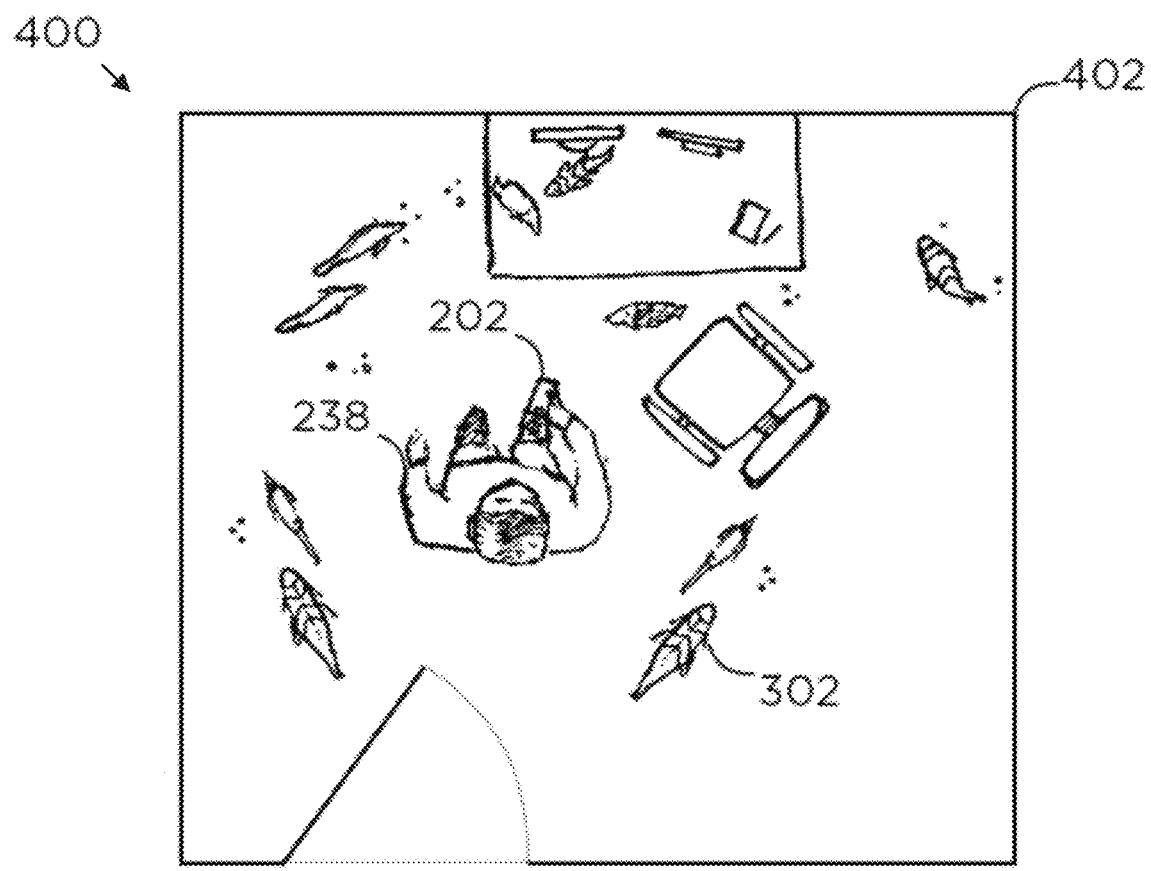
FIG. 7 illustrates overlap of a virtual experience and the real world, in accordance with some embodiments of the present disclosure.

FIGS. 6 and 7 visualize the same exemplary experience as seen in a smartphone screen 300, and as if the virtual world and real world overlapped 400. A virtual experience can include flocks of virtual objects 302 that move in certain patterns as in FIGS. 6 and 7. Further, the virtual experience can include combinations of the environment audio, affirmations, meditations, mental exercises that appeal to users, other audio components, and content integrations with other platforms. Environment audio includes natural or fictional sounds related to the objects, be it an animal, a fictional creature, an inanimate object. Affirmations, meditations, and mental exercises include pre-recorded or computer-generated generic speeches that are associated with the composition of the experience. In some embodiments, in the virtual experience, the user can listen to AI-assisted meditation, more specifically, meditations where the text thereof is formed using a deep neural network, personalized for the user, vocalized by custom AI-generated voices. For example, on the subject of integration with other platforms, in a virtual experience, the user can connect to other applications. An embodiment can be a user listening to a custom playlist of songs via connecting to a music streaming platform, such as SPOTIFY, where the virtual medium changes depending on the song. In the system, pre-recorded meditations can be produced by content creators that are experts of the related art and can be delivered to users on-demand from the cloud.

Figure 8:
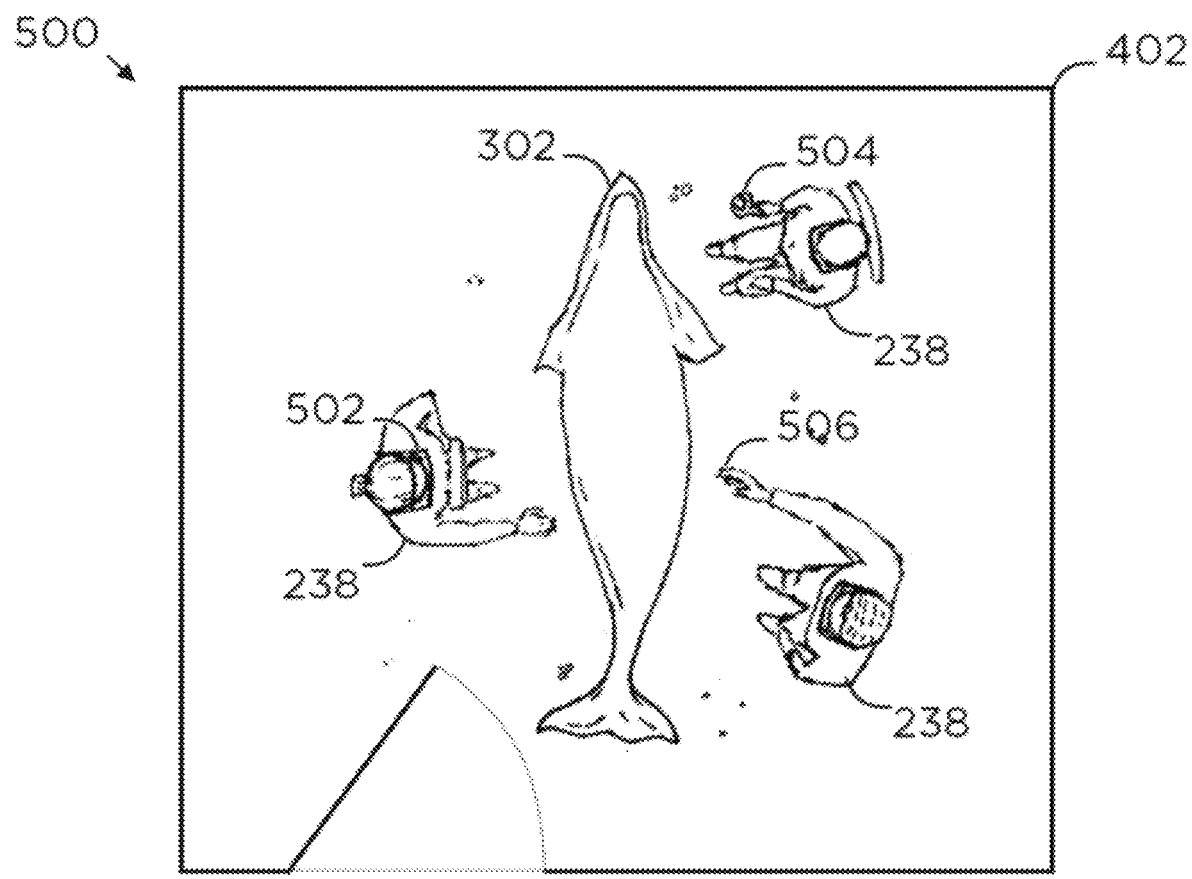
FIG. 8 illustrates a multi-user virtual experience, in accordance with some embodiments of the present disclosure.

In some embodiments, as shown in FIG. 8, users can join a multi-user virtual experience 500, created from the personal data of one or more users, which can be personalized for one or more users in collaboration. In this virtual experience, users can experience shared interactions utilizing an optical head-mounted display 502 with a wireless controller 504 or touch interactions and hand gesture recognition systems 506 via image processing, etc. Multi-user virtual experiences can also be referred to as collaborative virtual experiences and are realized according to some embodiments. In some embodiments of the collaborative virtual experience, one or more of the users can invite others to their own virtual experience, create a joint experience, or for instance can match with other users by a matching mechanism. Further, users can be connected from third-party social media platforms, or they can connect with a method that is included in the dedicated application of the system. This connection can be shown to users via a user list and allow the user to choose one or more other users to communicate and collaborate with.

Realization of the extended reality system can be within an app, a program, or an applet executed on a computing device. It should be noted that there can be several potential combinations. Embodiments of the disclosed system can employ computational devices such as smartphones and wearable devices such as smartwatches, smart glasses, head-mounted displays etc. Additionally, the present system can employ further computational devices that includes at least one hardware processor, a user interface coupled with the processor including an input device, a camera, and a display screen, memory, and can receive and transmit data via the network.

Personalization of virtual experiences is a process of computer-implemented method, including statistics, machine learning, and reasoning mechanisms as a way to create a virtual environment that is more relatable, appealing, charming, relevant to the needs, concerns, and interests of the user. Furthermore, the process could be utilized as a way to know the user mentally, as demonstrated in FIG. 6, producing a mental profile 218, and creating a virtual experience 224 personalized for the user. Virtual experience creation module 220 includes a matching mechanism of mental profile characteristics and various settings and parameters of virtual experience. In the process, users are also provided with personalized advertisements 222 in virtual experiences. This process is a cloud-based operation that creates necessary parameters to create a virtual experience in clients' devices. Initial personal data 216 is associated with age, gender, geographical region, interests, hobbies, personal notes, memos, photographs, etc. that are collected from various sources. Moreover, personal data is also further populated with the feedback module 226. The feedback module utilizes the data of users' way of using the virtual experience that includes user inputs such as behavioral data, movement, number, and types of interaction(s) with virtual objects, time spent in certain locations in 3D space, as in 3D mapped version of 402, time spent in certain types of experiences and manual user feedback. In some embodiments, virtual experience changes in real-time according to user inputs. Further and more in detail, user inputs can include all parameters gathered from sensors of the computing device such as a microphone for voice commands, accelerometer, gyroscope and/or camera for movement parameters, GPS for geolocation, touch sensor for touch gestures, similar sensors, and hardware that have similar functions that can be operated to interact with virtual space or virtual objects.

Figure 5:
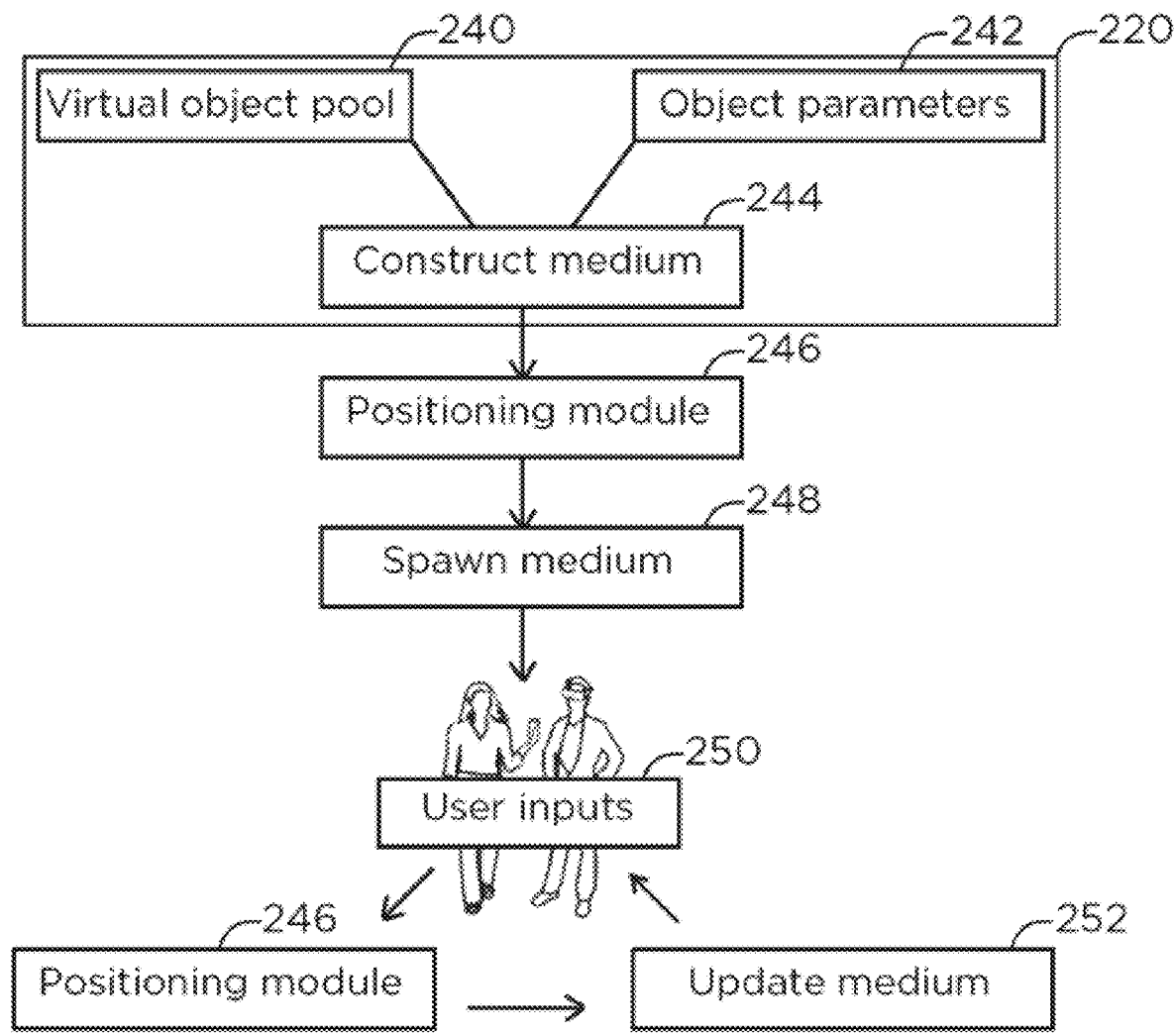
FIG. 5 illustrates a diagram of creation and delivery of a virtual experience, in accordance with some embodiments of the present disclosure.

Virtual experience creation module 220, initial spawn location, and further movements of the virtual objects are demonstrated in FIG. 5. As it is illustrated further visual representations are illustrated in FIGS. 6 to 10, virtual experience includes a medium 244 constructed by two components: virtual object pool 240 and object parameters 242. Object pool includes every digital element that can be used, and object parameters dictate the roles of said objects on the medium. Specifically, in the embodiment shown in FIG. 7, the medium uses three fish models, a bubble model, and an ambient soundtrack from pool 240. The route, animation, location, size, number of the fishes and bubbles, the boundary they can move in are denoted by parameters 242. In the next step, the positioning module 246 determines the initial spawn 248 positions of the medium. After spawning, positional parameters of the medium update 252 constantly in response to user inputs 250 obtained by positioning module 246. In an embodiment, examples of the initial position of user 238 and virtual objects 302 are shown in FIG. 7. In this embodiment, fish are in a flock movement circling around user 238, and following the user 238, as the user 238 moves around the house, and also continuing to circle around the user, and avoiding the boundaries of room. For example, some methods of AR utilize SLAM, or LIDAR scan. These methods can detect physical boundaries of the real world for virtual objects to fill in. This process is realized by the positioning module 246. In an embodiment, as shown in FIG. 8, the virtual experience object 302 can be spawned and positioned within detected physical boundaries in front of the user 238 by gaze sensing and eye tracking utilizing HMD 502.

Seamless creation method of virtual experiences includes steps that provide users a virtual experience while utilizing automatic and uninterrupted 3D space approximation by whatever appropriate method and placement to provide realistic transitions from real world to XR experience. For example, consider a user using a mobile app or applet of the present disclosure on a smartphone that can utilize SLAM method using camera. Placement of the virtual experience occurs just after the device can appropriate a 3D space using camera feed and can locate the virtual camera (eye/camera that synchronizes with device screen for XR experiences) location (smartphone location in this case) to ensure seamless transition to virtual world. In another example, consider a user using a mobile app or applet of the present disclosure on a smartphone that can utilize a gyroscope sensor for AR.

Placement of the virtual experience occurs just after the device can appropriate a local rotation and place the virtual environment accordingly.

In some embodiments, users can build their experiences from an empty scene, choosing from a set of assets of audio, 3D models, animations, meditations, affirmations, etc. In some embodiments, users can change, add, or extract from the experience that is automatically generated for them. Some embodiments of the present system can include a virtual experience that is procedurally generated while the user is wandering around a virtual environment using a computing device.

Figure 9:
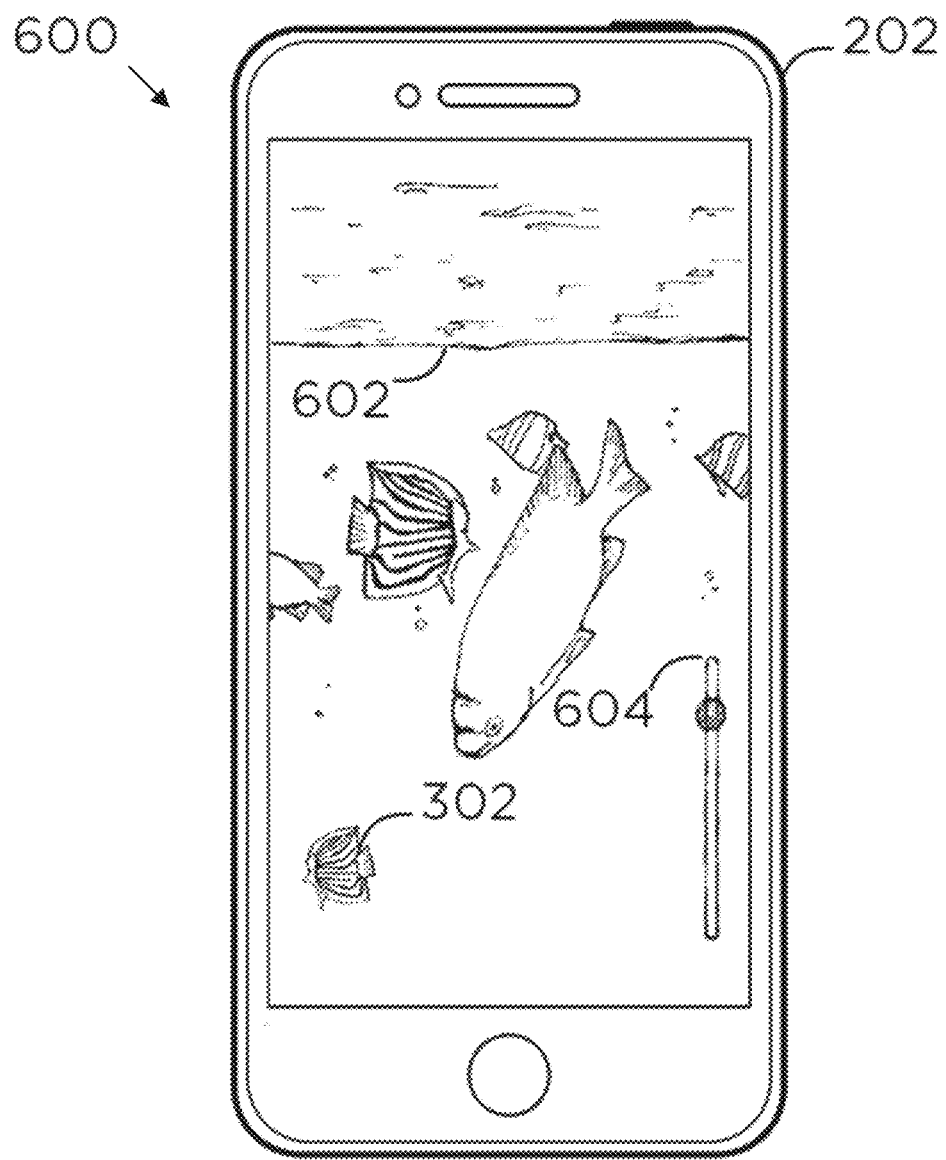
Figure 10:
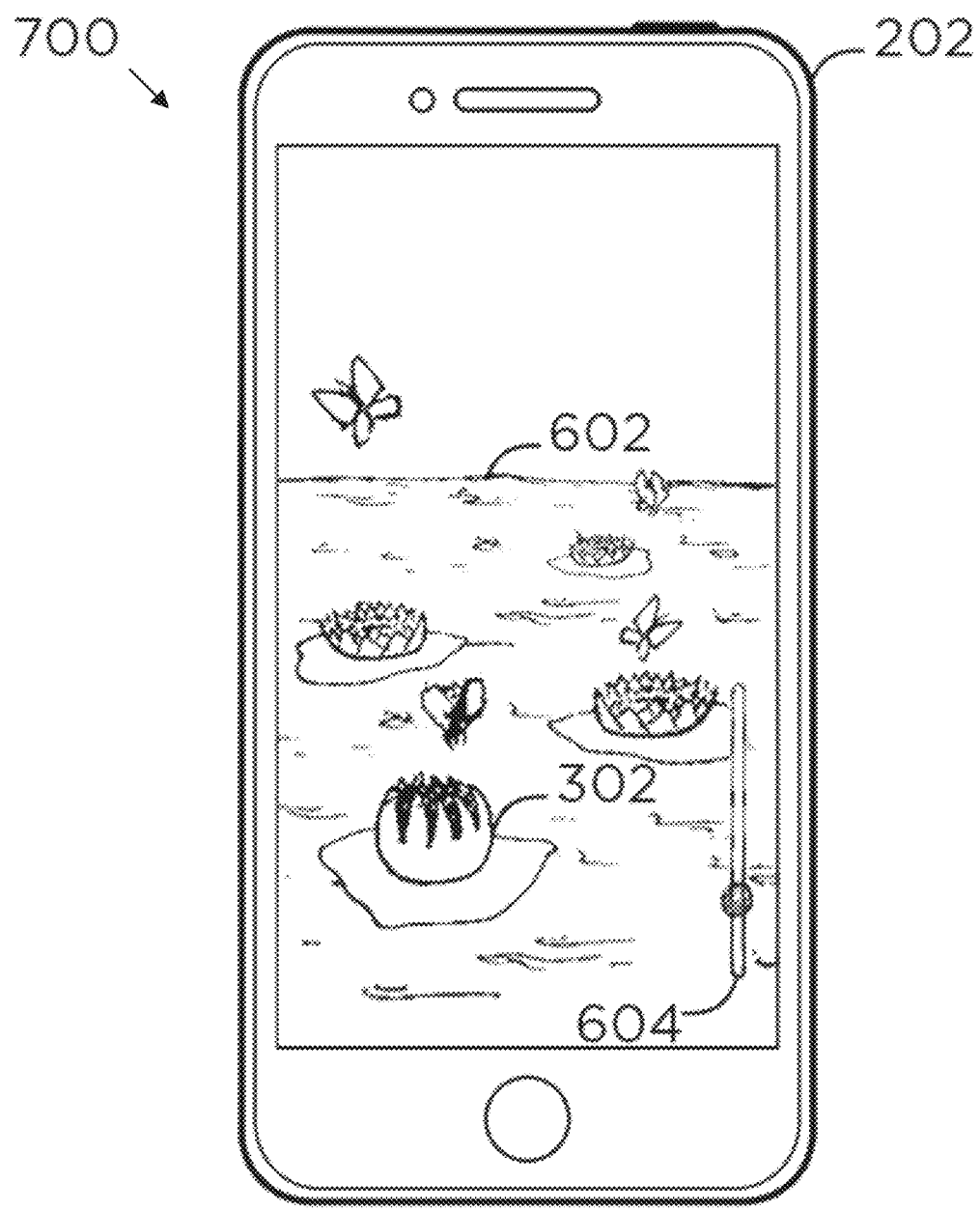
Figure 11:
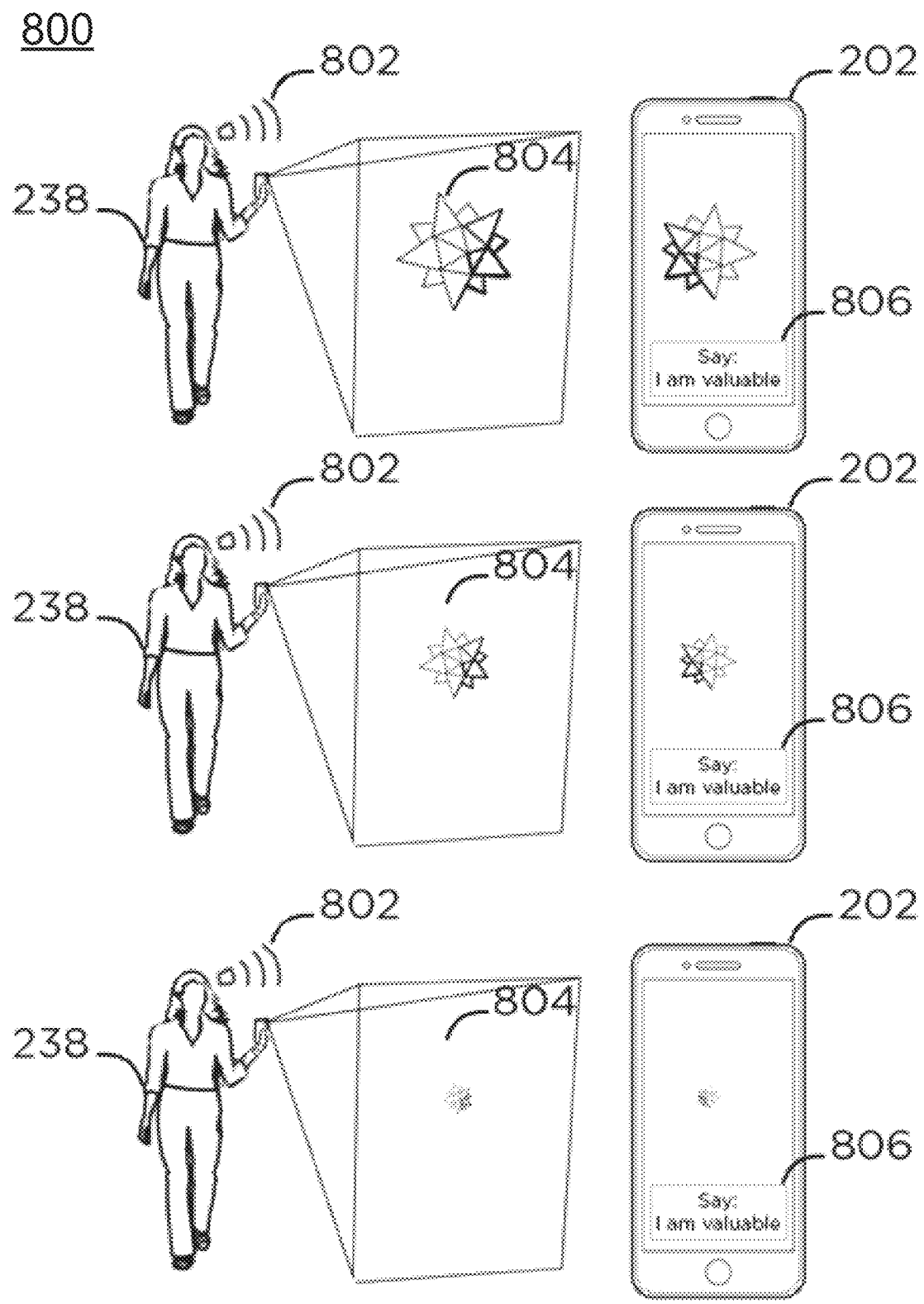
FIG. 11 shows a user manipulating virtual objects via speech, in accordance with some embodiments of the present disclosure.

The interactivity of the virtual experience, in some embodiments, associates with a response to user inputs via sensors and actuators such as smartphone sensors, the camera, touchscreen sensor, accelerometer, gyroscope, pedometer, LIDAR, Bluetooth controllers, and head-mounted display (HMD) sensors, camera, gyroscope, accelerometer, any type of health sensors, or sensors and actuators of similar functions. For instance, a user can be wandering around a virtual experience that includes of two or more different ambiances, as represented in FIGS. 9 to 10, more specifically the user can be on a water surface 602, surrounded by lotus flowers and butterflies flying in the vicinity 700. This virtual environment constitutes the first ambiance. The second environment can be underwater containing fishes and a thick layer of virtual solid medium representing water 600. This virtual setting can be manipulated by the user by changing the medium of the virtual experience via user interface elements, more specifically, where the user can raise and lower the level of the water surface 602 by touch controlling slider 604. The examples on the manipulation of the virtual settings can be reproduced as changing size, number, animation speed, animation of the virtual objects by utilizing many of the user inputs such as touch, movement, speech, etc. In some embodiments, such as the example illustrated in FIG. 11, an exemplary emotional exercise 800, running in the designated mobile application, an object that resembles "bad thoughts" 804, a prompt appears that includes of an affirmation text 806 the user 238 needs to articulate. When a user articulates that specific affirmation 802, the system is configured to recognize it. For example, this recognition can be realized with speech-to-text conversion method and matching it with the affirmation text 806. As a result of a successful match, a virtual object 804 shrinks that goes to the disappearance of the object step by step.

In virtual experiences, to increase the immersion of the interactive experience, virtual environments can have a reactive state with real world environments where inputs from device and connected components manipulate virtual experience components and manipulations in virtual experience components to send feedback to the user device and connected components. Connected components include head-mounted displays, including display apparatuses (e.g., eye tracker, controllers), audio input and output devices, accelerometer sensor, gyroscope sensor, GPS (Global Positioning System) sensor, IoT sensor etc. Some embodiments include a user in the proximity of a connectable RGB lamp, using an augmented or mixed reality headset connected to the lamp, an audio output and haptic gloves, in a virtual experience containing variety of virtual objects that are each represented by a specific geometry and virtual lighting color matching connected lamp. When user touches one of the objects using hands, this interaction can (1) cause appropriate haptic feedback by gloves, (2) cause virtual object to change its geometrical state, (3) output a sound effect validating interaction, (4) cause lamp to change its current color and, (5) cause virtual lighting color to synchronize with the lamp color.

In some embodiments, an incomplete virtual experience can be created for users to complete as a part of a training, meditative, coaching or similar session. Incomplete virtual experiences can include uncolored objects, objects that have incomplete geometric aspects, mini-puzzles for users to complete as a part of the session.

As some interactions can include interactive sessions for one or more of meditative, training, coaching or similar means, virtual experiences can provide conversation-like audio interaction methods to augment the impact of the session. To further explain the method, consider an embodiment including: a user, using the app or applet of the present disclosure in a smartphone, in a virtual experience including a coaching session, including step-by-step audio instructions delivered in that particular virtual experience. In the experience, the user may need to articulate a confirming statement that is detectable by the device microphone and processed by a speech-to-text method to proceed through the session. The process creates a back and forth conversation-like inclusive coaching session, improving interaction.

In some examples, while spending time in a virtual experience, the user might skip to another virtual experience, by using a virtual object that indicates a change of virtual experience, for instance, a 3D model of a magical portal. In some embodiments, users can actualize skipping by screen touch gestures to left and right. Similar to this interaction, for instance, a user engaging the virtual experience employing an optical head-mounted display, the user can skip to another virtual experience via hand gestures, using a designated sensor-glove.

Regarding meditative virtual experiences, the system enhances the meditation process. In some embodiments, an adjustable pause regulation system is provided in order to better transition into meditative states. A fixed pause system between guided instructions during meditation might not be suitable for a variety of people with different mental features. Some might find the duration between affirmations, instructions, etc. short while others find it long. Regulation mechanism controls play times of sections of audio chunks based on the preferences of the users. In an embodiment, an adjustable bar as a UI element is used to scale the pauses between instructions on a sectioned audio. Further examples of enhancements, meditative virtual experiences are gamified. Apart from conventional gamification elements in meditation applications, the present system has XR-based gamification mechanisms. In some embodiments, using the designated mobile application, users can observe the virtual objects in the virtual experience being progressed, which are parts of a long meditative virtual experience, as visually changing, simulating an enhancement in a virtual experience, invoking a sense of accomplishment and progress on the part of the user.

In some other embodiments concerning interactivity types, the present system can have a process for personalized meditation in accordance with user-requested inputs. More specifically, for example, in the designated mobile application, the system can request users to interact with certain objects or can request users voice input in the virtual experience to build out the structure of a modular meditation process in this example, the meditation created with the help of the feedback module. User's interactions are collected for profiling the user regarding their needs, desires, aims, etc. for interpretation purposes, as mentioned before, for creating a mental profile 218. The interpretation can result in personalized virtual therapy sessions. Furthermore, in the system, this profiling can be interpreted by the system for the various selection or matching results. For example, this profiling result can be used for consensually matching users via matching module 228. The matching module, 228 first generates a user pool to be matched based on proximity 230. Afterward, it filters out users' 238 preferences for matching other users 232. In some embodiments, these preferences could be age or sex. Then the mental profile characteristics of the users are matched and scored 234. For example, a user can have answered the questions similarly in the virtual experiences, they have been interacting similarly to the virtual objects or they have been focusing on similar types of meditations, in those cases, the matching score will be high. Lastly, it provides users with results 236.

In some embodiments, this profiling can be used for selecting users in a specific geographical region, practicing a specific profession, and in a specific behavioral profile, that system can provide the information. More specifically, a use case for mental profiles can be an institution looking for employees searching through users that are actively looking for job opportunities suitable for the mental characteristics that they are looking for. In some embodiments, the system can be used as a virtual interviewing platform, a scoring mechanism according to the mental criteria the employer is looking for. For example, for a job opening in a company, applicants are set to complete a specific virtual experience, designed for this assignment. After completion, the user's (applicant's) experience is scored, and how the user reacts to every part of the experience, can be reviewed.

Figure 13:
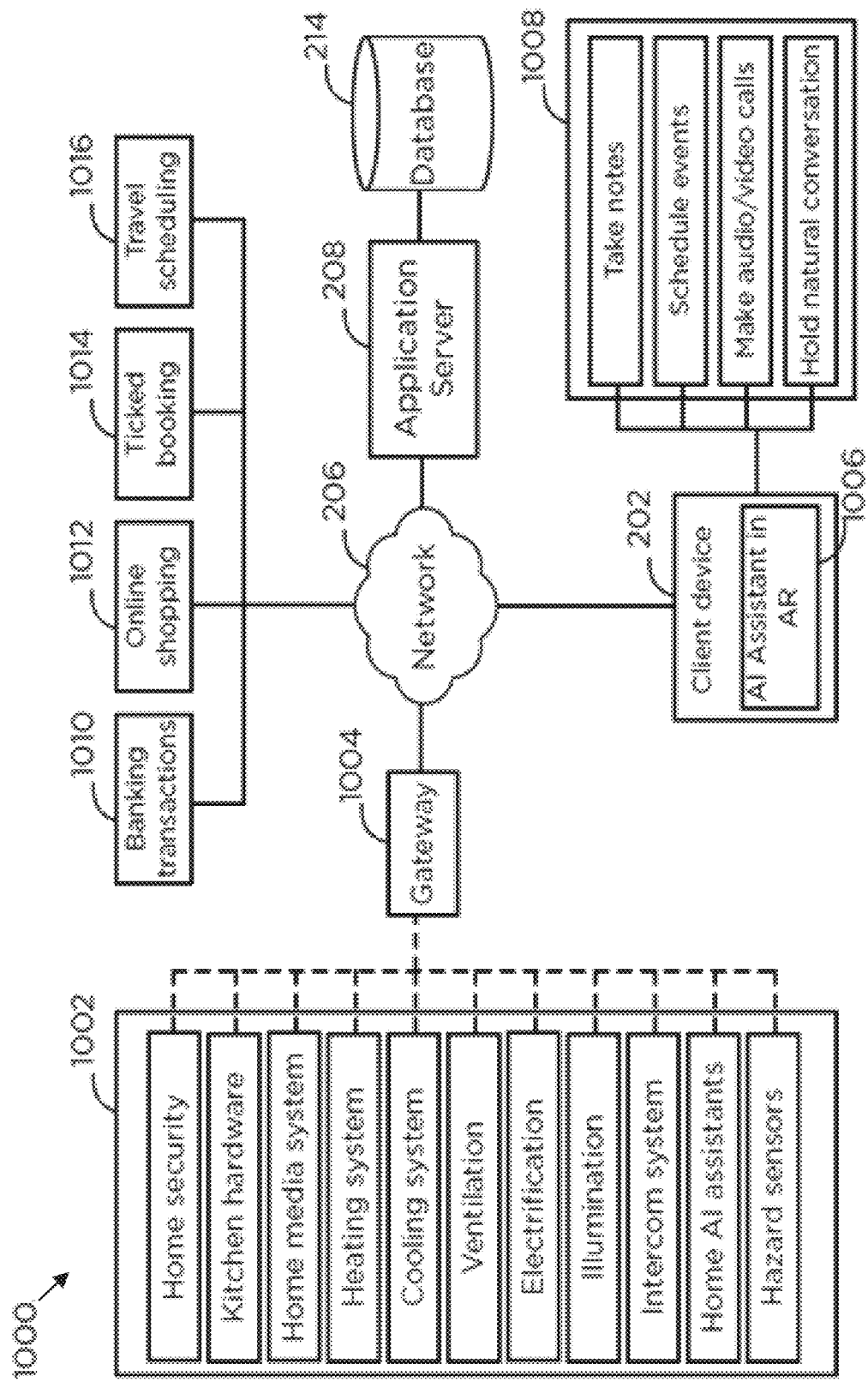
FIG. 13 illustrates a diagram showing aspects of an artificial intelligence (AI) based personal assistant in AR, in accordance with some embodiments of the present disclosure.

In some embodiments, the virtual experience can contain a 3D model that can engage in dialogue with the user and can act as a companion. The aforementioned 3D models can be embodied as a human, humanoid or a similar model of a creature the user can interact with. Further, a virtual companion can be an AI-assisted bot that helps the course of virtual experience. As demonstrated in FIG. 13, in a scheme demonstrating AI companion and its capabilities 1000, an AI companion can be a personal AR assistant 1006 that users can control smart home components 1002. A gateway 1004 connects these components to users' computing devices through the network 206. In some embodiments, AR assistant 1006 recognizes users' voice commands and proceeds a banking transaction 1010 for the user, helping online shopping 1012, schedule travel plans 1016 and book tickets 1014. AR assistants can also utilize devices' conventional capabilities 1008 like taking notes, making calls and holding conversation with the user. Feedback from the Internet of Things (IoT) sensors and actuators connected to the gateway can further modify the actions and state of the virtual companion.

Virtual experiences can be created by the users themselves. In embodiments, a user using a mobile app or applet can be supplied with a variety of limited digital content including combinations of 3D animated models of flora, fauna, imaginary creatures, 360° video, environment audio, affirmations, meditations, mental exercises to choose from and create a virtual experience setting.

Figure 14:
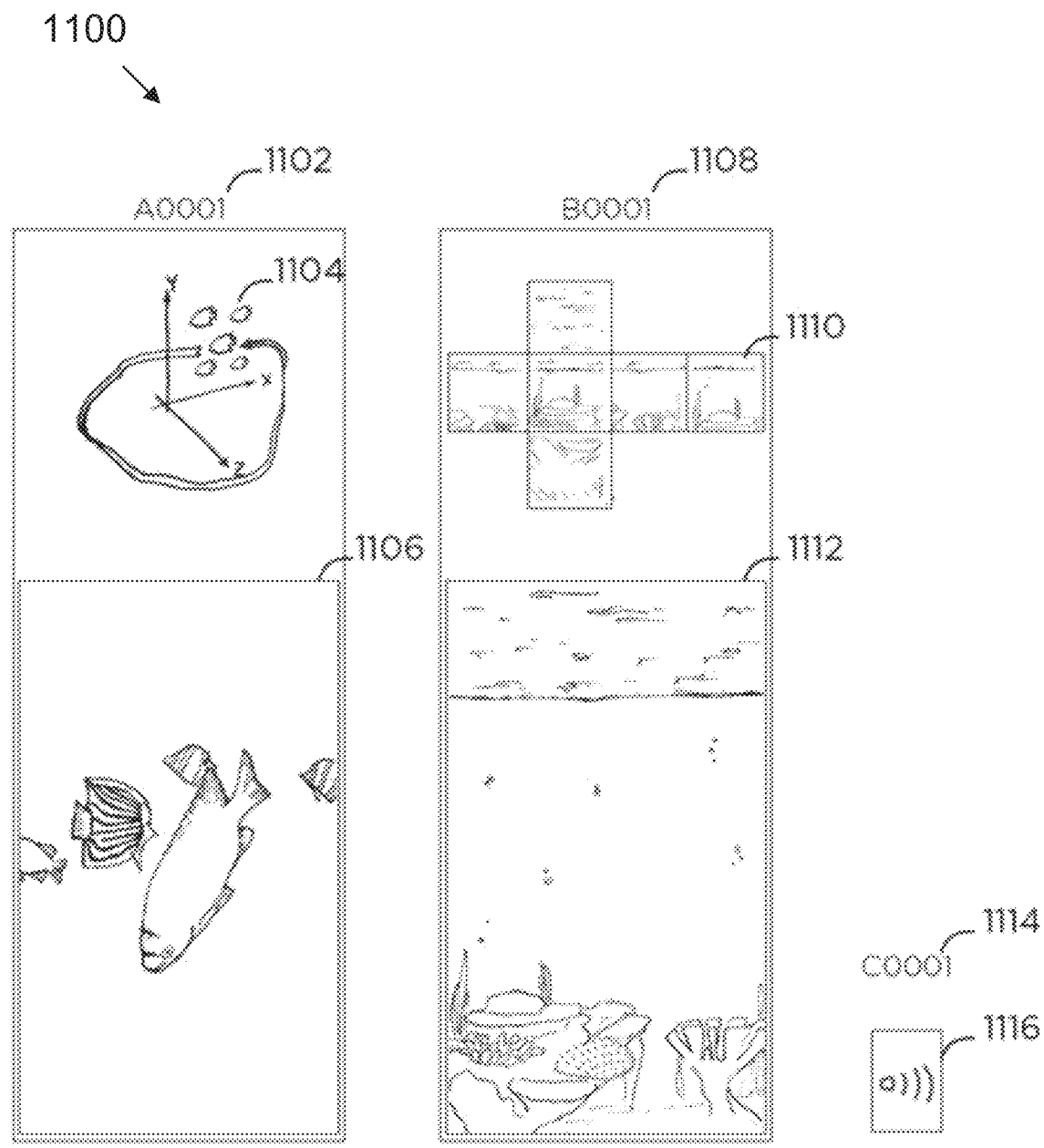
FIG. 14 shows digital content keys that are used in virtual experience keys, in accordance with some embodiments of the present disclosure.
Figure 15:
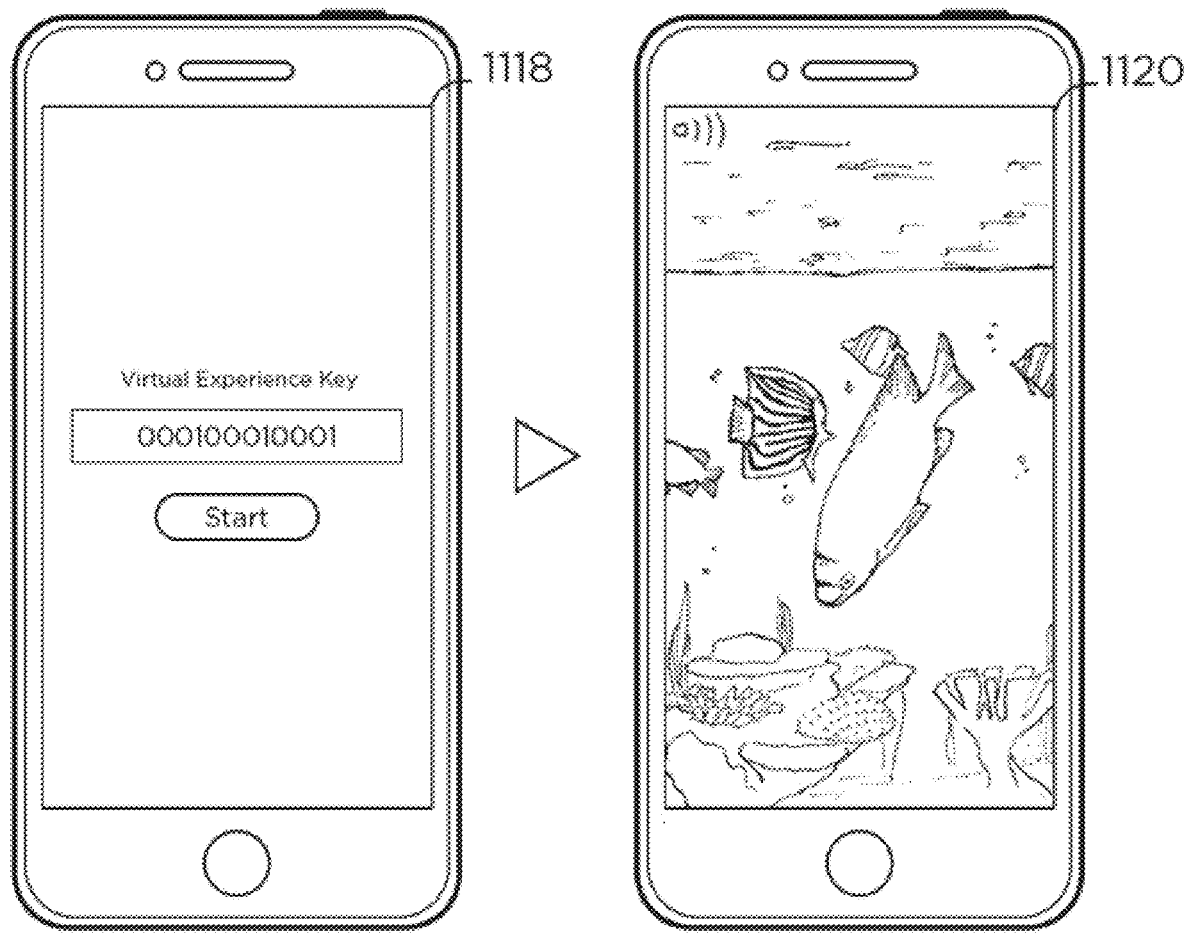
FIG. 15 illustrates an interface of a virtual experience creation from a virtual experience key, in accordance with some embodiments of the present disclosure.

Virtual experiences include combinations of a limited (but expandable) set of digital content that can come down to a specific sequence of characters as keys, e.g., see FIG. 14. Every character or section of the key can refer to selection or usage of the digital content 1100. Utilizing this structure, users can save, re-experience, share, and give a virtual experience. In some embodiments, a user, in an app or applet, creates an experience from given choices of digital content and shares the generated key to another user via social media or messaging platform. The second user can access the same virtual experience by entering the key to an input field that is a part of the interface to open specific virtual experiences utilizing the virtual experience key, and virtual experience automatically generated by determining the digital content and the way it's used in the virtual experience from characters and sections of characters of the key. Virtual experience keys can include a set of 12 characters and 3 character sequences, AAAABBBBCCCC where sequences alone can create a key for a digital component. "A" sequence alone represents a virtual object setting with defined object types, quantity, and animation. "B" sequence alone represents a background setting that can be a spherical or cubic mesh covered with an image or a video, "C" sequence alone represents audio settings that can include persistent, looping, time or event triggered audio. To further explain, suppose "A0001" digital component key 1102 stands for a flock of angel fish moving in a looping circular path creating a cylindrical flock 1104, "B0001" digital component key 1108 stands for a cubic underwater image 1110, "C0001" digital component key 1114 stands for a looping underwater sound recording 1116. To help the understanding of the concept, e.g., see FIG. 14, visual representations (e.g., how it would look if the content were put in a 3D space if looked at it from a screen) of the digital content is illustrated 1106, 1112. Coming together, if typed in a user interface designed for this specific purpose 1118 (e.g., see FIG. 15), provided by the app or applet, "000100010001" virtual experience key grants access to an underwater virtual experience containing corresponding digital components of animated fish flock, surrounding underwater spherical background and underwater soundtrack 1120 (e.g., see FIG. 15).

Save, re-experience and share methods of virtual experiences via keys can be integrated with a blockchain. Virtual experiences can be represented and distributed as tokens. To be more specific, a virtual experience key can be stored in a token's metadata that is created in a blockchain that has NFT token standard. In some embodiments, a blockchain server including at least one node that processes blockchain ledger data according to a blockchain protocol, and a user device installed with a wallet client that provides information used for processing the blockchain ledger data and minting of a virtual experience token including virtual experience key in its metadata. In some embodiments, device can further include at least one hardware processor, a user interface coupled with the processor including an input device, a camera, and a display screen, a memory storing instructions that, when executed by the at least one processor including instructions that cause the system to perform operations including: cause reading virtual experience key value from metadata of an owned token from users' wallet, cause a virtual experience to be interpreted from virtual experience value characters.

Tokenization can form a convenient ground for a marketplace of virtual experiences and digital content that forms said virtual experiences. An ownership mechanism where users can possess the ownership of the key for a specific virtual experience is disclosed in an embodiment, where said virtual experience can be distributed as a singular token that represents a key or multiple tokens representing the copies of the key. In some embodiments, a user using an app or applet that is integrated with a wallet client, connected to a blockchain server including at least one node that processes blockchain ledger data according to a blockchain protocol, can generate a key for a personalized virtual experience and mint a token carrying the virtual experience key string in token's metadata, which is accessible through users' wallet. Minted token can be sent to another user. The second user, by connecting the app to a wallet client, allows the app to read metadata of the token and create a virtual experience using the unique key.

In some embodiments, wherein a virtual experience is created on an augmented reality system, the system is configured to choose the best available method of augmented reality. For instance, the best method of augmented reality can be camera assisted AR if devices' light sensors determine that there is sufficient light to process camera frames. If light is not sufficient, the device can proceed using a sensor assisted AR, without processing camera frames and merely overlapping camera footage with virtual objects.

Figure 12:
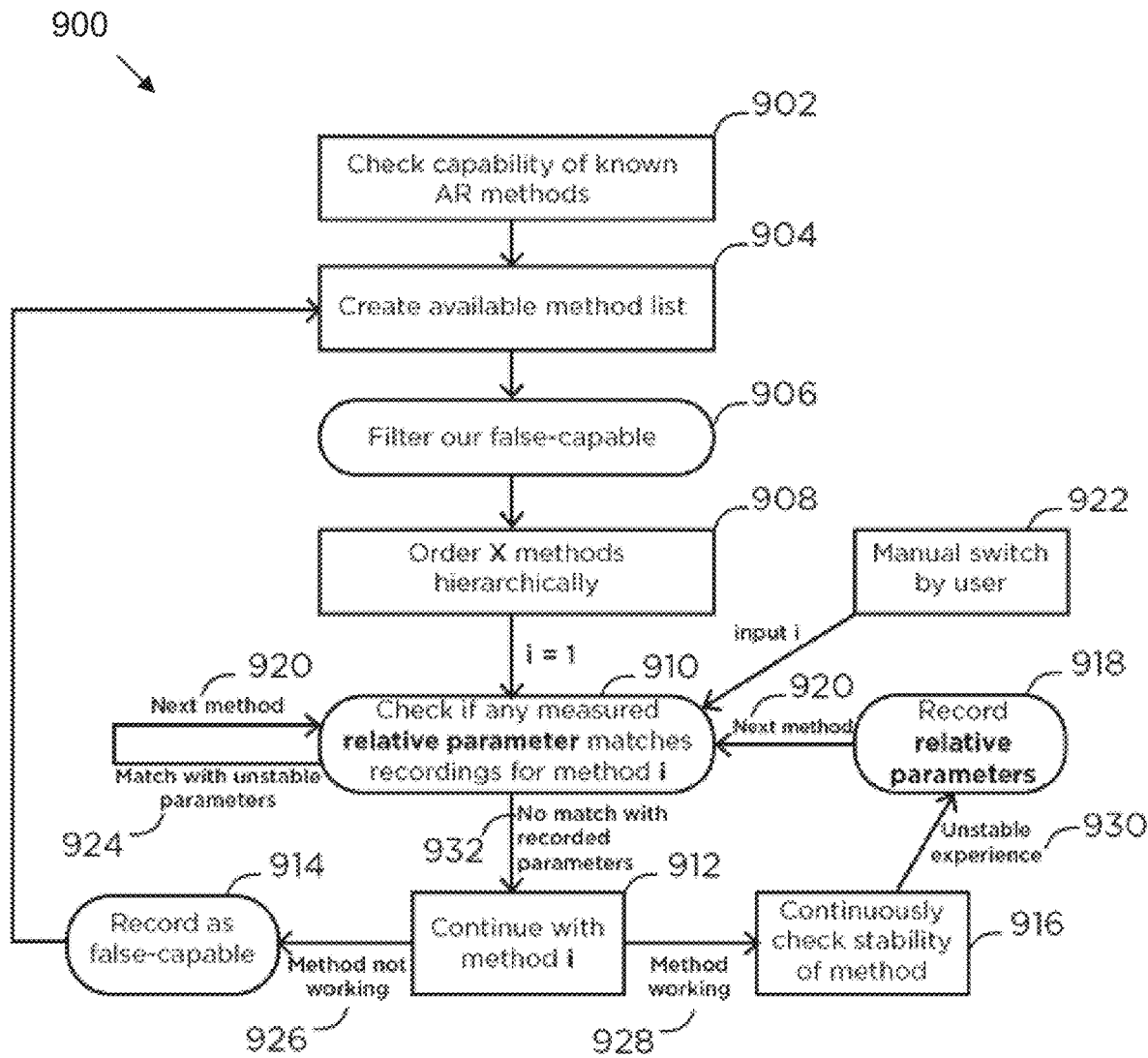
FIG. 12 illustrates operations of adaptive and predictive AR method switching mechanisms, in accordance with some embodiments of the present disclosure.

In an embodiment shown in FIG. 12, the diagram demonstrates an adaptive and predictive AR method switching mechanism 900 utilized by the system. Before the user launches a virtual experience using a computing device, a process is out into operation whereby the capability of known AR methods is checked at step 902. For example, said capability can be measured by checking a sensor's availability. Subsequently, the system creates a list of available methods 904. For example, it shall be considered that there are three AR methods to utilize, method A, B and C, whereby A is SLAM, a camera assisted AR method that determines camera position by detecting feature points to track in camera frames, B is a method using gyroscope sensor for movement tracking, and C is a method using accelerometer sensor for movement tracking. System filters out false-capable information at step 906, meaning, if a method checks out as capable in first step 902 but the device completely fails to utilize that method 926, it is recorded to the database 914 and is recognized and filtered out as false-capable in this step 906. Afterwards, methods are ordered in a hierarchical manner 908, meaning, the more desired method will be the first one that the system tries to implement. In the case of the specific example elaborated hitherto, methods A, B, C are listed as 1, 2 and 3. In the next step, any relative parameters that can be recorded before for method 1 is checked 910. More specifically, relative parameters for method 1, SLAM, can be the "lux" value that is received from light sensors of the device. This value can be recorded, as the selected AR method results in an unstable virtual experience at step 918. Therefore, as this control step is executed, if light sensor values match any previously-recorded unstable parameters 924 the system moves on to the next method 920. However, if not 932, the system proceeds with method 1 912. Whereas system proceeds with method 1, and if it is working 928, the system continuously checks the stability of the selected method 916, to record the parameters that might be relevant to failure 930 to the database at step 918. This process aims to prevent further failures and to help build a causal framework of the problem. System also allows the end user to switch between methods manually 922.

The call to action module in the present system is an output of synthesized user data that the system offers to the user in the conclusion of the virtual experience. Further, it is a suggestion, a recommendation, and advice that might be in the form of an advertisement that is directed to a place, platform, institution. In some embodiments, users can acquire a call to action after following through a virtual experience, which is an advertisement directed to nutrition, wellness, personal training, investment, therapy, or a charity platform. Calls to action and responses thereto by users can have an effect on the virtual experience. In some embodiments, the user proceeds a meditative virtual experience, including of a rain of money, and financial affirmations. In the experience, an advertisement is made in the form of a meditative voice, transforming raining paper money models to transform into a logo or a visual representation of the advertisement to visually support the advertisement. Connected to that investment platform, if the user chooses to invest, and makes a profit, next time the user enters the same virtual experience, the amount of money is increased in response to the profits, with the aim of encouraging the user.

Some embodiments can include a computer implemented method, including: at least one hardware processor, a user interface coupled with the processor including an input device, a camera, and a display screen, and a memory coupled with the processor storing instructions that, when executed by at least one processor including the instructions that cause the system to perform operations including: causing a virtual experience containing digital elements to be created by a predetermined or dynamically created settings; causing a real world image to display at the display screen and virtual objects to be rendered on the display screen by overlapping to create augmented reality (AR) or mixed reality (MR) virtual experience; causing virtual objects to move together in accordance to the real world images in an overlapped 3D space to realize AR virtual experience by determining movement metrics gathered by sensors; tracking user feedback data gathered by various sensors, actuators and input devices, connected to hardware components; and causing a reaction on digital elements in virtual experience in response to detecting feedback, selected from a pool of predetermined behavioral settings. Predetermined settings mentioned previously and onwards in the present invention stand for settings that help a computing system to compose a complete virtual experience without needing any further user input. These settings may comprise a parameter dictating which digital elements are included in the experience, shape, color, size of a digital element, speed of the digital element. Settings, included in the process of "creation of the digital elements by a predetermined or dynamically created experience settings" further comprising selection of digital elements, initial placement of digital elements initial movement behaviors of digital elements or flock of digital elements. Reactions are changes on the virtual experience settings that are selected to be used in reaction to the user feedback. In an exemplary embodiment, in the designated application, a user creates an aquarium virtual experience which may have initial settings such as: Use 3 fish models, set the size of flock to 10 and flock movement to circular movement as visualized 400 in FIG. 7

In some instances, virtual experience is a virtual medium created from digital components including objects, flocks of objects, environment audio, affirmations, meditations, special effects, mental exercises, etc. In some instances, determining movement metrics gathered by sensors further includes gathering movement data from one or more of metrics based on acceleration from accelerometer readings, metrics based on rotational movement readings of gyroscope, metrics based on data appropriated from camera feed using SLAM (Simultaneous Localization and Mapping) method, metrics based on location and positional change appropriated from readings from IoT devices and stationary wireless devices, metrics based on geolocation and positional change on geolocation data of GPS (Global Positioning System) sensor. In some instances, feedback data contains one or more of change of or snapshot of location, rotation, and orientation readings, movement, hand gestures, voice, illumination, etc. gathered by various sensors, actuators, input devices, and connected hardware components including data gathered from head-mounted displays, audio input, and output devices, accelerometer sensor, gyroscope sensor, or GPS sensor. In some instances, a predetermined pool of behavior further includes changes in digital components including change shape, color, size animation, animation speed, add a digital element, play a sound, and show a text.

In some instances, the method includes a predictive AR/MR method selecting and switching mechanism in accordance to environmental parameters and available methods. In some instances, environmental parameters include illumination, available trackable surfaces, trackability of surfaces etc.

In some instances, the method includes determining a call to action utilizing users' personal data and behavioral data in a virtual experience. In some instances, call to action further includes an advertisement in a form of 3D text, image animation or video positioned in the experience, a voice guiding the user to the advertised content.

In some instances, the method includes detecting a placement time and introduction method in the 3D space for a call to action. In some instances, introduction method further includes detecting one or more elements in virtual 3D space or physical 3D space for objects related to call to action to attach to or transform into. In some instances, objects related to call to action include one or more of a text, an animated model, a static model, a sound, an audio recording, and a video recording. In some instances, the attaching includes the objects related to call to action to be anchored to elements in virtual 3D space or physical 3D space by position and/or rotation. In some instances, the transforming into includes elements in virtual 3D space or physical 3D space to physically change into the objects related to call to action.

In some instances, the method includes encoding the set of digital content and environment settings that store virtual experiences in virtual experience keys. In some instances, the virtual experience keys are based on a sequence of characters where each sequence includes one or more characters, and each sequence represents a digital content of virtual experience.

In some instances, the method includes decoding the virtual experience keys to create virtual experiences in a specific set of settings and digital content.

In some instances, the method includes providing a personal experience utilizing user-provided and behavioral personal information.

In some instances, the method includes creating a virtual experience where plurality of users are present in the same session where positioning of the users are visualized by an object identifying the user.

In some instances, the method includes gamification of virtual experiences by providing visually incomplete or visually transformable experiences as puzzles and tracking user progress and scoring.

Some embodiments can include a system, including: at least one hardware processor; a user interface coupled with the processor including an input device, a camera, and a display screen; and a memory coupled with the processor storing instructions that, when executed by at least one processor including the instructions that cause the system to perform operations including: cause a virtual experience containing digital elements to be created by a predetermined or dynamically created settings; cause a real world image to display at the display screen and virtual objects to be rendered on the display screen by overlapping to create augmented reality (AR) or mixed reality (MR) virtual experience; cause virtual objects to move together in accordance to the real world images in an overlapped 3D space to realize AR virtual experience by determining movement metrics gathered by sensors; track user feedback data gathered by various sensors, actuators and input devices, connected to hardware components; and in response to detecting feedback, selected from a pool of predetermined behavioral settings, causes a reaction on digital elements in virtual experience. In some instances, determining movement metrics gathered by sensors further includes gathering movement data from one or more of metrics based on acceleration from accelerometer readings, metrics based on rotational movement readings of gyroscope, metrics based on data appropriated from camera feed using SLAM (Simultaneous Localization and Mapping) method, metrics based on location and positional change appropriated from readings from IoT devices and stationary wireless devices, and metrics based on geolocation and positional change on geolocation data of GPS (Global Positioning System) sensor. In some instances, the feedback data contains one or more of change of or snapshot of location, rotation, orientation readings, movement, hand gestures, voice, illumination, etc. gathered by various sensors, actuators, input devices, and connected hardware components including data gathered from head-mounted displays, audio input, and output devices, accelerometer sensor, gyroscope sensor, and a GPS sensor.

In some instances, the method of the system includes detecting a placement time and introduction method in the 3D space for a call to action. In some instances, introduction method further includes detecting one or more elements in virtual 3D space or physical 3D space for objects related to call to action to attach to or transform into. In some instances, the attaching includes the objects related to call to action to be anchored to elements in virtual 3D space or physical 3D space by position and/or rotation.

In some instances, the method of the system includes a predictive AR/MR method selecting and switching mechanism in accordance with environmental parameters and available methods. In some instances, environmental parameters include illumination, available trackable surfaces, trackability of surfaces etc.

Some embodiments can include a computer implemented method including: a blockchain server including at least one node that processes blockchain ledger data according to a blockchain protocol; and a user device installed with a wallet client that provides information used for processing the blockchain ledger data and minting of a virtual experience token including virtual experience key in its metadata. The device includes at least one hardware processor, a user interface coupled with the processor including an input device, a camera, and a display screen as well as a memory storing instructions that, when executed by at least one processor including instructions cause the system to perform operations including: cause reading a key value from metadata of an owned token from users' wallet; cause a virtual experience to be interpreted from virtual experience key value sequences; cause a real world image to display at the display screen and virtual objects to be rendered on the display screen by overlapping to create augmented reality (AR) or mixed reality (MR) virtual experience; and cause the virtual experience to be rendered to create a virtual reality on the display screen.

Figure 16:
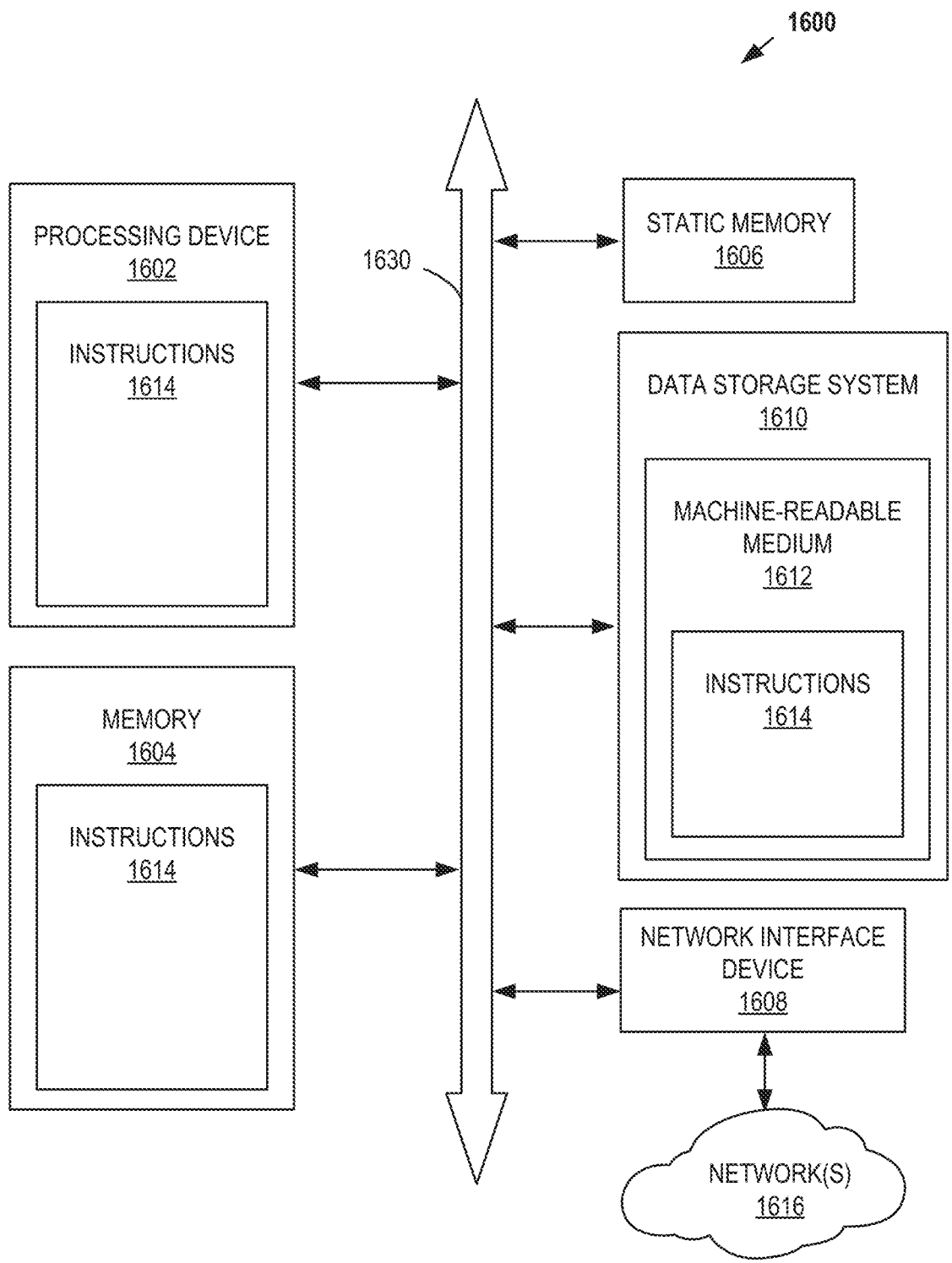
FIG. 16 illustrates is a block diagram of example aspects of an example computing system, in accordance with some embodiments of the present disclosure.

FIG. 16 illustrates is a block diagram of example aspects of an example computing system 1600, in accordance with some embodiments of the present disclosure. FIG. 16 illustrates parts of the computing system 1600 within which a set of instructions, for causing a machine of the computing system 1600 to perform any one or more of the methodologies discussed herein, can be executed. In some embodiments, the computing system 1600 can correspond to a host system that includes, is coupled to, or utilizes memory or can be used to perform the operations of a controller. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 1600 includes a processing device 1602, a main memory 1604 (e.g., read-only memory (ROM), flash memory, dynamic random-access memory (DRAM), etc.), a static memory 1606 (e.g., flash memory, static random-access memory (SRAM), etc.), and a data storage system 1610, which communicate with each other via a bus 1630.

The processing device 1602 represents one or more general-purpose processing devices such as a microprocessor, a central processing unit, or the like. More particularly, the processing device can be a microprocessor or a processor implementing other instruction sets, or processors implementing a combination of instruction sets. The processing device 1602 can also be one or more special-purpose processing devices such as an application specific integrated circuit (ASIC), a field programmable gate array (FPGA), a digital signal processor (DSP), network processor, or the like. The processing device 1602 is configured to execute instructions 1614 for performing the operations discussed herein. The computing system 1600 can further include a network interface device 1608 to communicate over one or more LAN/WAN networks 1616.

The data storage system 1610 can include a machine-readable storage medium 1612 (also known as a computer-readable medium) on which is stored one or more sets of instructions 1614 or software embodying any one or more of the methodologies or functions described herein. The instructions 1614 can also reside, completely or at least partially, within the main memory 1604 and/or within the processing device 1602 during execution thereof by the computing system 1600, the main memory 1604 and the processing device 1602 also constituting machine-readable storage media. While the machine-readable storage medium 1612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The LAN/WAN network(s) 1616 can include one or more local area networks (LAN(s)) and/or one or more wide area networks (WAN(s)). The LAN/WAN network(s) 1616 can include the Internet and/or any other type of interconnected communications network. The LAN/WAN network(s) 1616 can also include a single computer network or a telecommunications network. More specifically, the LAN/WAN network(s) 1616 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
recording a first lux value in response to determining that application of a camera-assisted virtual experience method provides unstable results when said first lux value is sensed by a light sensor,
assessing the camera-assisted virtual experience method by determining whether a light sensor value received from the light sensor matches any previously recorded lux value of a set of previously recorded lux values, which includes the first lux value,
if the light sensor value does not match any previously recorded lux value of the set of previously recorded lux values, generating, by a computing system applying the camera-assisted virtual experience method, a virtual experience on a device, wherein the camera-assisted virtual experience method detects feature points to track in camera frames, and
if the light sensor value matches any previously recorded lux value of the set of previously recorded lux values, refraining from applying the camera-assisted virtual experience to generate the virtual experience and generating, by the computing system applying a motion sensor-assisted virtual experience method, the virtual experience on the device,
wherein the generating of the virtual experience is based on predetermined settings and wherein the virtual experience comprises digital elements,
wherein the generating of the virtual experience comprises generating a real world image and virtual objects, and
wherein the digital elements comprise the real world image and the virtual objects;
outputting, by the computing system, the real world image for display on a display screen;
outputting, by the computing system, the virtual objects to be displayed on the display screen, wherein the virtual objects overlap the real world image to provide the virtual experience;
determining, by the computing system, an initial location of a user device to correctly place the virtual experience based on information sensed by a plurality of sensors that are in a real world location that is proximate to a location recorded in the real world image;

determining, by the computing system, movement metrics of said user device, based on information sensed by the plurality of sensors, wherein movement metrics comprise at least one of: accelerometer readings, gyroscope readings, GPS coordinates, location and positional change appropriated from readings from IoT devices or stationary wireless devices; and continuing, by the computing system, to output the movement of the digital elements and said user device in the virtual experience in accordance with the movement metrics.

2. The method of claim 1, further comprising:

tracking, by the computing system, user feedback data collected by the plurality of sensors or second sensors, actuators, or other types of devices that collect input from a user;

selecting, by the computing system, a reaction based on predetermined behavioral settings stored in the computing system; and outputting, by the computing system, reactions of the digital elements in the virtual experience to be displayed on the display screen according to the part of the user feedback data.

3. The method of claim 1, wherein the virtual experience comprises an augmented reality (AR) experience, a mixed reality (MR) experience, or a virtual reality (VR) experience.

4. The method of claim 1, wherein the information sensed by the plurality of sensors comprises data collected from an accelerometer and/or a gyroscope.

5. The method of claim 1, wherein the information sensed by the plurality of sensors comprises data collected from a global positioning system.

6. The method of claim 1, wherein the information sensed by the plurality of sensors comprises data collected from a camera feed related to environmental parameters comprising illumination, trackable surfaces, and trackability of surfaces.

7. The method of claim 6, wherein the data collected from the camera feed is input for simultaneous localization and mapping (SLAM).

8. The method of claim 1, further comprising generating and outputting, by the computing system, advertising content anchored to a virtual object to be displayed on the display screen.

9. The method of claim 8, wherein the generating of the advertising content is based on user profile data of a user.

10. The method of claim 9, wherein the user profile data comprises demographic data of the user.

11. The method of claim 9, wherein the user profile data comprises psychographic data of the user.

12. The method of claim 1, further comprising encoding, by the computing system, the digital elements to store the virtual experience in virtual experience keys.

13. The method of claim 12, further comprising decoding, by the computing system, the virtual experience keys to output the virtual experience according to a group of settings.

14. The method of claim 1, further comprising:

adding, by the computing system, puzzles to the virtual experience;

tracking, by the computing system, interaction with the puzzles by a user;

scoring, by the computing system, the interaction with the puzzles; and adding, by the computing system, results of the scoring to the virtual experience.

15. The method of claim 1, wherein the camera-assisted virtual method is simultaneous localization and mapping (SLAM), and the motion sensor-assisted virtual experience method comprises at least one of a method using a gyroscope sensor for movement tracking or a method using an accelerometer sensor for movement tracking.

16. The method of claim 1, further comprising collecting user inputs during the virtual experience, synthesizing a call to action from the collected user inputs, generating a call to action to the user in the virtual experience, where the call to action includes an affirmation virtual object corresponding to a visual, audio and/or textual information displayed in the virtual experience corresponding to an affirmation.

17. The method of claim 1, further comprising generating an affirmation virtual object corresponding to a visual, audio and/or textual information displayed in the virtual experience corresponding to an affirmation, monitoring a user verbal response to the affirmation virtual object, determining whether the user verbal response matches with the affirmation, and in response to the matching, the affirmation virtual object is removed from the virtual experience.

18. The method of claim 1, wherein the virtual objects comprise a flock of virtual objects, and in response to user device movement, the movement metrics generate changes to the flock movement including flock size, flock speed, dispersion of flock units, movement boundaries of flock of digital elements, individual graphical features, movement animations and parameters including speed, destination, size, color and shape of the flock of the virtual objects.

19. A non-transitory computer readable storage medium comprising computer program instructions configured to instruct a computer processor to perform at least the steps of:

recording a first lux value in response to determining that application of a camera-assisted virtual experience method provides unstable results when said first lux value is sensed by a light sensor, assessing the camera-assisted virtual experience method by determining whether a light sensor value received from the light sensor matches any previously recorded lux value of a set of previously recorded lux values, which includes the first lux value, if the light sensor value does not match any previously recorded lux value of the set of previously recorded lux values, generating, by applying the camera-assisted virtual experience method, a virtual experience on a device, wherein the camera-assisted virtual experience method detects feature points to track in camera frames, and if the light sensor value matches any previously recorded lux value of the set of previously recorded lux values, refraining from applying the camera-assisted virtual experience to generate the virtual experience and generating, by applying a motion sensor-assisted virtual experience method, the virtual experience on the device, wherein the generating of the virtual experience is based on predetermined settings and wherein the virtual experience comprises digital elements, wherein the generating of the virtual experience comprises generating a real world image and virtual objects, and wherein the digital elements comprise the real world image and the virtual objects;

outputting the real world image to be displayed on a display screen;

outputting the virtual objects to be displayed on the display screen, wherein the virtual objects overlap the real world image to provide the virtual experience;

determining an initial location of a user device to correctly place the virtual experience based on information sensed by a plurality of sensors that are in a real world location that is proximate to a location recorded in the real world image;

determining, by the computer processor, movement metrics of said user device, based on information sensed by the plurality of sensors, wherein movement metrics comprise at least one of: accelerometer readings, gyroscope readings, GPS coordinates, location and positional change appropriated from readings from IoT devices or stationary wireless devices; and continuing to output the movement of the digital elements and said user device in the virtual experience in accordance with the movement metrics.

20. A computing device comprising:

at least one processor; and a storage medium tangibly storing thereon program logic configured to instruct the at least one processor to at least:

record a first lux value in response to determining that application of a camera-assisted virtual experience method provides unstable results when said first lux value is sensed by a light sensor, assess the camera-assisted virtual experience method by determining whether a light sensor value received from the light sensor matches any previously recorded lux value of a set of previously recorded lux values, which includes the first lux value, if the light sensor value does not match any previously recorded lux value of the set of previously recorded lux values, generate, by applying the camera-assisted virtual experience method, a virtual experience on a device, wherein the camera-assisted virtual experience method detects feature points to track in camera frames, and if the light sensor value matches any previously recorded lux value of the set of previously recorded lux values, refrain from applying the camera-assisted virtual experience to generate the virtual experience and generate, by applying a motion sensor-assisted virtual experience method, the virtual experience on the device, wherein the generating of the virtual experience is based on predetermined settings and wherein the virtual experience comprises digital elements, wherein the generating of the virtual experience comprises generating a real world image and virtual objects, and wherein the digital elements comprise the real world image and the virtual objects;

output the real world image to be displayed on a display screen;

output the virtual objects to be displayed on the display screen, wherein the virtual objects overlap the real world image to provide the virtual experience;

determine an initial location of a user device to correctly place the virtual experience based on information sensed by a plurality of sensors that are in a real world location that is proximate to a location recorded in the real world image;

determine movement metrics of said user device, based on information sensed by the plurality of sensors, wherein movement metrics comprise at least one of: accelerometer readings, gyroscope readings, GPS coordinates, location and positional change appropriated from readings from IoT devices or stationary wireless devices; and continue to output the movement of the digital elements and said user device in the virtual experience in accordance with the movement metrics.

21. The method of claim 1, further comprising:

checking, by a computing system, a capability of known virtual experience methods including the camera-assisted virtual experience method and the motion sensor-assisted virtual experience method, creating a list of at least one available virtual experience method of the known virtual experience methods, and when a virtual experience method checked out as capable on said created list of at least one available virtual experience method and a device having said computing system fails to utilize said at least one available virtual experience method, recording the at least one available virtual experience method to a database and recognizing and filtering out the at least one available virtual experience method as a false-capable.

22. The method of claim 21, further comprising ordering listed virtual experience methods in a hierarchical manner, where virtual experience methods filtered out as false-capable are below in hierarchy compared to other virtual experience methods, and implementing a first virtual experience method in said hierarchical order.

23. The method of claim 22, allowing a user to switch between virtual experience methods manually via an input device.

* * * * *